Nov. 26, 1957 — R. GALE — 2,814,317
BEVERAGE DISPENSING MACHINES
Filed July 1, 1955 — 8 Sheets-Sheet 1
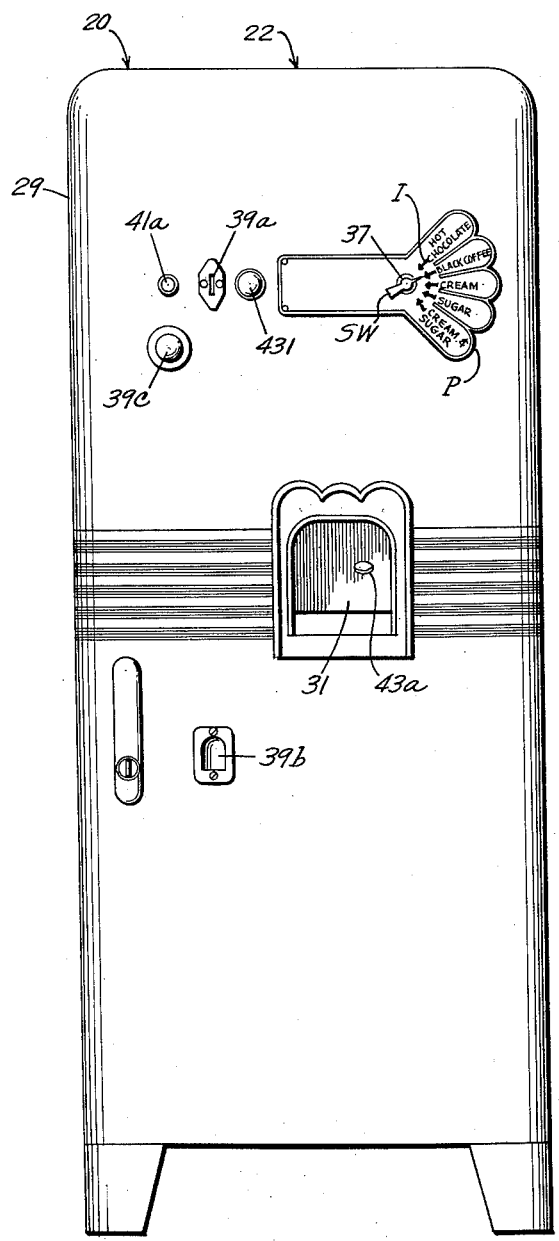
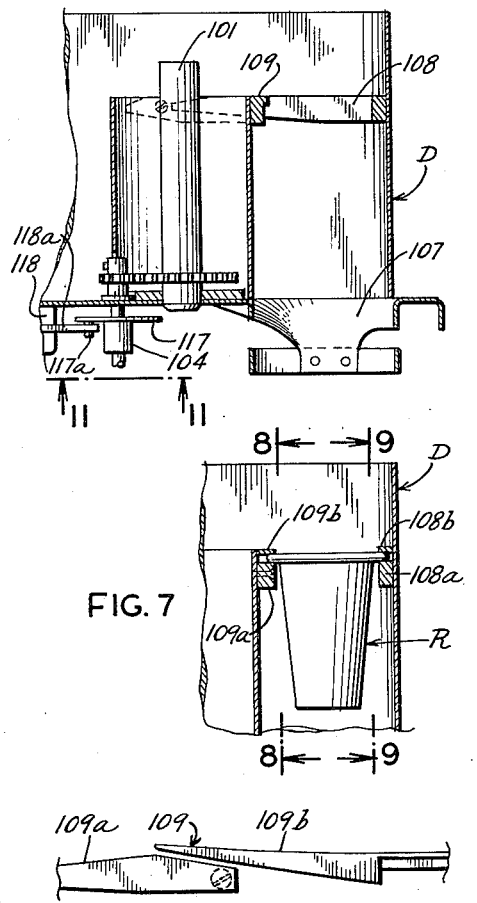
INVENTOR
RONALD GALE
BY
Wallace and Cannon
ATTORNEYS Nov. 26, 1957     R. GALE     2,814,317
BEVERAGE DISPENSING MACHINES
Filed July 1, 1955     8 Sheets-Sheet 2

INVENTOR.
RONALD GALE
BY
Wallace and Cannon
ATTORNEYS

Nov. 26, 1957  R. GALE  2,814,317
BEVERAGE DISPENSING MACHINES
Filed July 1, 1955  8 Sheets-Sheet 4
FIG. 4
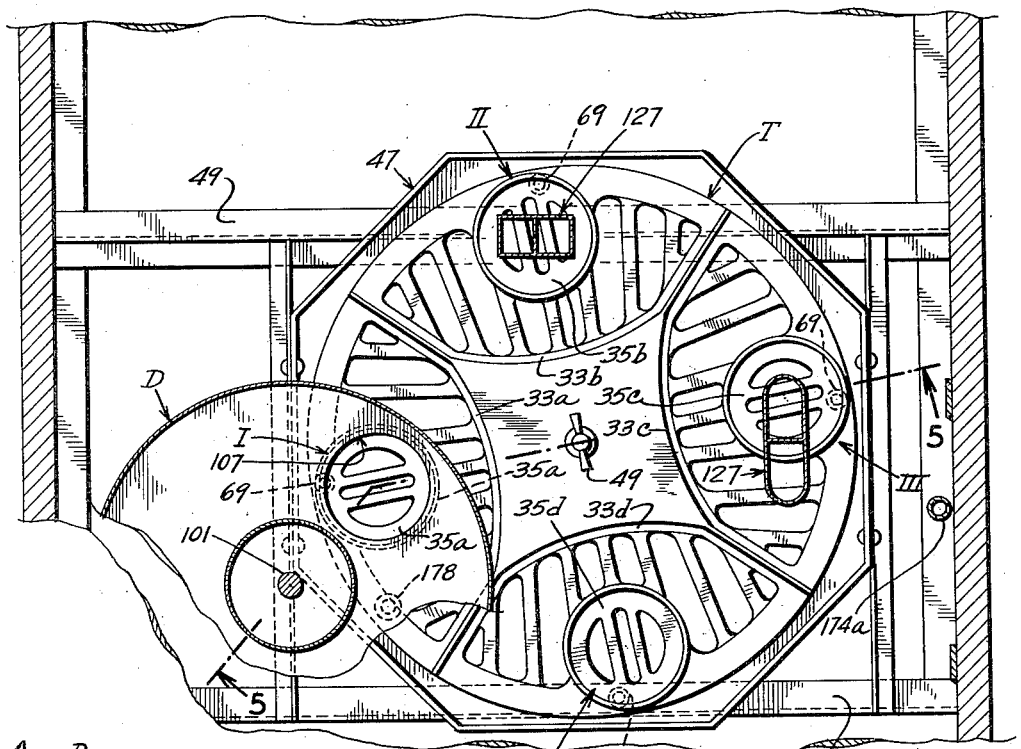
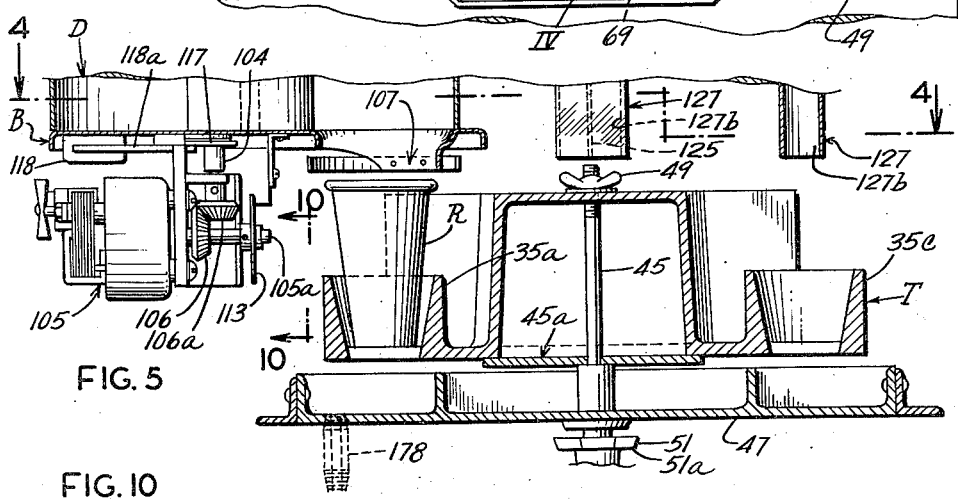
FIG. 5
FIG. 10
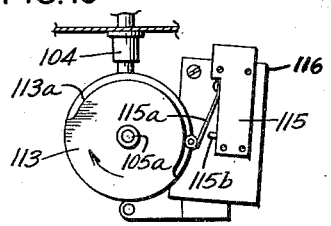
FIG. 11
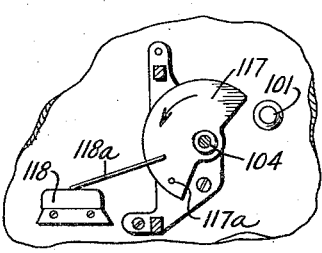
INVENTOR.
RONALD GALE
BY Wallace and Cannon
ATTORNEYS Nov. 26, 1957  R. GALE  2,814,317
BEVERAGE DISPENSING MACHINES
Filed July 1, 1955  8 Sheets-Sheet 5
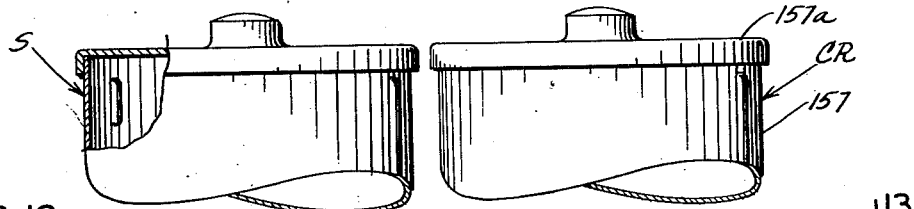
FIG. 12
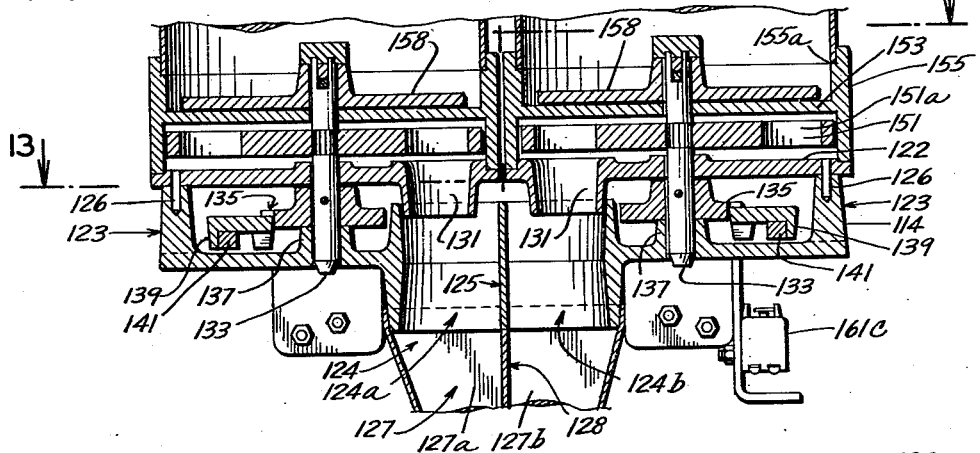
FIG. 13
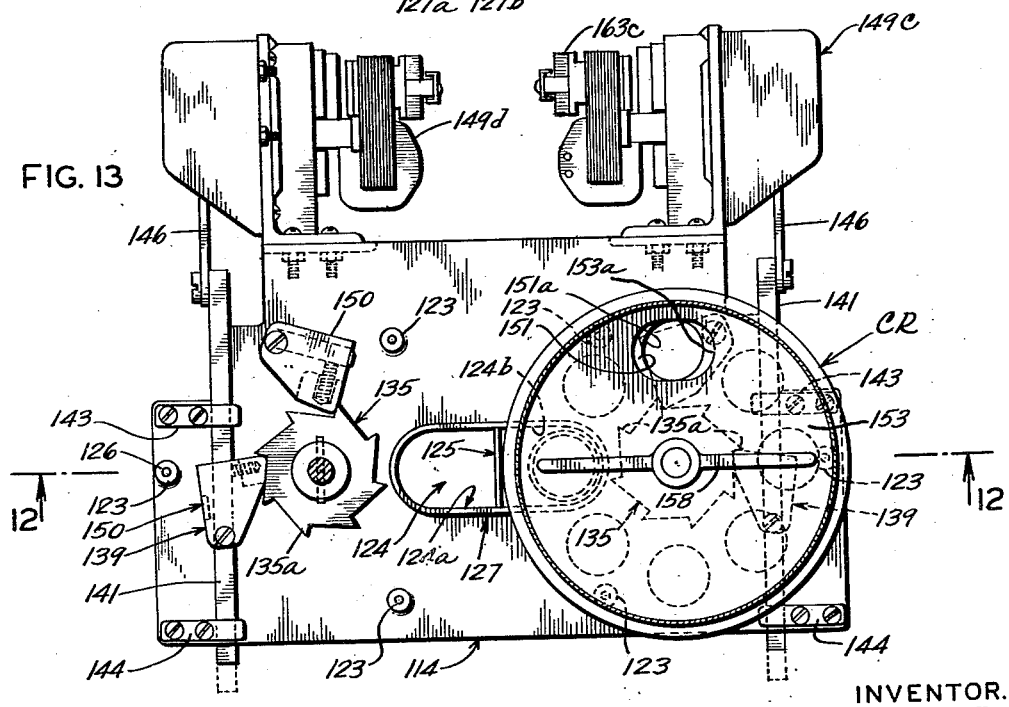
INVENTOR.
RONALD GALE
BY
Wallace and Cannon
ATTORNEYS Nov. 26, 1957    R. GALE    2,814,317
BEVERAGE DISPENSING MACHINES
Filed July 1, 1955    8 Sheets-Sheet 6

INVENTOR
RONALD GALE
BY
Wallace and Cannon
ATTORNEYS

Nov. 26, 1957
R. GALE
2,814,317
BEVERAGE DISPENSING MACHINES
Filed July 1, 1955
8 Sheets-Sheet 7
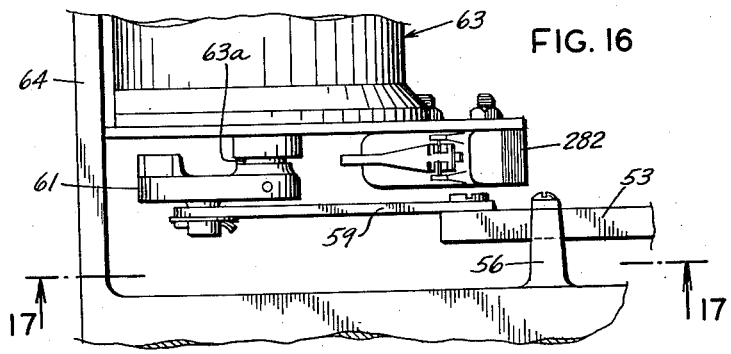
FIG. 16
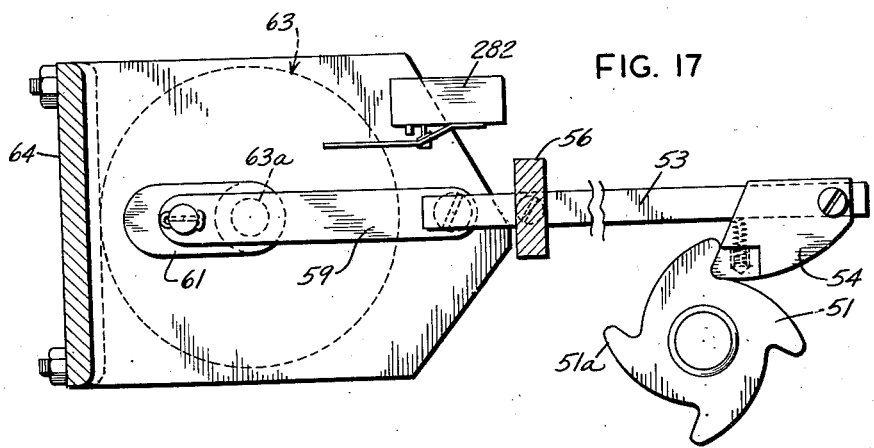
FIG. 17
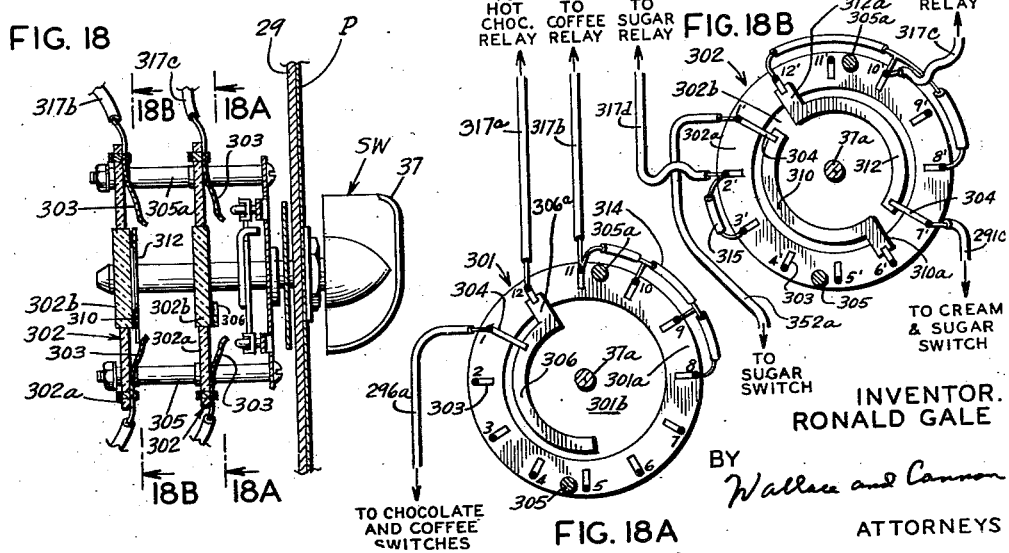
FIG. 18
FIG. 18A
FIG. 18B
INVENTOR.
RONALD GALE
BY Wallace and Cannon
ATTORNEYS Nov. 26, 1957  R. GALE  2,814,317
BEVERAGE DISPENSING MACHINES
Filed July 1, 1955  8 Sheets-Sheet 8

INVENTOR.
RONALD GALE
BY Wallace and Cannon
ATTORNEYS

United States Patent Office 2,814,317
Patented Nov. 26, 1957

2,814,317

BEVERAGE DISPENSING MACHINES

Ronald Gale, Madison, Wis., assignor to Coan Manufacturing Company, Madison, Wis., a corporation of Wisconsin Application July 1, 1955, Serial No. 519,469

15 Claims. (Cl. 141—103)

This invention relates to beverage vending machines and, more specifically, to machines which are particularly well adapted to selectively vend a plurality of beverages in paper cups or the like.

Beverage vending machines of the general nature of my novel machine have heretofore been known in the art. However, such machines as have been heretofore known in the art have had several inherent disadvantages such as, for example, being complicated in construction or operation; being inefficient or ineffective in operation; being difficult to service; being large or bulky in size; being so constructed, or operating in such a manner, as to not be able to meet reasonable sanitary regulations; or not effectively separating beverage flavors and not effectively protecting against undesirable intermixing of such flavors, or the like. It is a primary object of my invention to afford a novel beverage vending machine which overcomes such undesirable features of machines heretofore known in the art.

Another object of my invention is to enable a plurality of different beverages to be selectively vended from a single machine in a novel and expeditious manner.

Another object of my invention is to afford a novel beverage vending machine of the aforementioned type which is simple to operate and reliable and positive in its operation.

A further object of my invention is to afford a novel beverage vending machine of the aforementioned type wherein the beverages vended thereby may be flavored by powdered ingredients which are dispensed in the machine in a novel and expeditious manner.

Another object is to effect selective dispensing of a plurality of powdered beverage ingredients in a novel and expeditious manner.

Yet another object of my invention is to enable powdered beverage ingredients to be stored and dispensed in a beverage vending machine of the aforementioned type in a novel manner whereby undesirable intermixing of the ingredients, or the flavors thereof, is avoided.

Another object of my invention is to provide a beverage vending machine of the aforementioned type wherein powdered ingredients and fluid may be dispensed in a novel and expeditious manner directly into the paper cup, or like receptacle, to be vended.

An ancillary object is to effect dispensing of the powdered ingredients, and the fluid, making up the beverage, into a suitable receptacle, such as, a paper cup, at different positions in a novel beverage vending machine, to assist in insuring that the powdered ingredients stored in the machine will not be undesirably dampened or moistened by fluid in the machine or by vapors therefrom.

Yet another object of my invention is to afford a novel beverage vending machine of the aforementioned type wherein the supplies of powdered ingredients may be quickly and easily replenished.

A further object of my invention is to insure that a customer, by dropping coins into the machine, does not unintentionally begin a beverage vending cycle of the machine prior to having been afforded an opportunity to select the beverage the customer chooses to obtain from the machine.

Another object of my invention is to afford a novel beverage vending machine of the aforementioned type wherein the cycles of operation of the ingredient dispensing mechanisms of the machine are selected and controlled in a novel and expeditious manner.

Another object of my invention is to insure that, in the normal operation of a beverage vending machine, if a prospective customer drops coins into the machine at a time when such action is ineffective to constitute one step in the initiation of a complete beverage vending cycle of operation of the machine, the coins will be returned to the customer.

Another object of my invention is to afford a novel beverage vending machine of the aforementioned type wherein, in the event of a power failure to the machine, all operation of the machine is effective stopped.

A further object of my invention is to afford a novel beverage vending machine of the aforementioned type wherein, in the event of stopping of the machine partially through a beverage vending cycle of operation of the machine, because of power failure to the machine, the machine may be quickly and easily and automatically retimed or, in other words, reset to the proper starting condition for a beverage vending cycle of operation, by going through the normal steps, one time, of initiation of a beverage vending cycle of the machine.

Another object of my invention is to afford a small, compact, novel beverage vending machine of the aforementioned type which is efficient in operation and may be readily and economically produced commercially.

Other and further objects of the present invention will be apparent from the following description and claims and are illustrated in the accompanying drawings which, by way of illustration, show a preferred embodiment of the present invention and the principles thereof and what I now consider to be the best mode in which I have contemplated applying these principles. Other embodiments of the inventions embodying the same or equivalent principles may be used and structural changes may be made as desired by those skilled in the art without departing from the present invention.

In the drawings:

Fig. 1 is a front elevational view of a vending machine embodying the principles of my invention;

Fig. 4 is a sectional view taken substantially along the line 4—4 in Fig. 2;

Fig. 5 is a sectional view taken substantially along the line 5—5 in Fig. 4;

Fig. 6 is a detail sectional view of a portion of the mechanism shown in Fig. 5 with certain parts thereof removed;

Fig. 7 is a detail sectional view taken substantially along the line 7—7 in Fig. 3;

Fig. 8 is a detail sectional view taken substantially along the line 8—8 in Fig. 7;

Fig. 9 is a detail sectional view taken substantially along the line 9—9 in Fig. 7;

Fig. 10 is a detail elevational view taken substantially along the line 10—10 in Fig. 5;

Fig. 11 is a detail bottom plan view taken substantially along the line 11—11 in Fig. 6;

Fig. 12 is a sectional view taken substantially along the line 12—12 in Fig. 3;

Fig. 13 is a sectional view taken substantially along the line 13—13 in Fig. 12;

Fig. 16 is a side elevational view of a portion of the mechanism shown in Fig. 15;

Fig. 17 is a sectional view taken substantially along the line 17—17 in Fig. 16;

Fig. 18 is a longitudinal sectional view through a portion of the mechanism shown in Fig. 1;

Fig. 18A is a sectional view taken substantially along the line 18A—18A in Fig. 18;

Fig. 18B is a sectional view taken substantially along the line 18B—18B in Fig. 18.

Figure 2:
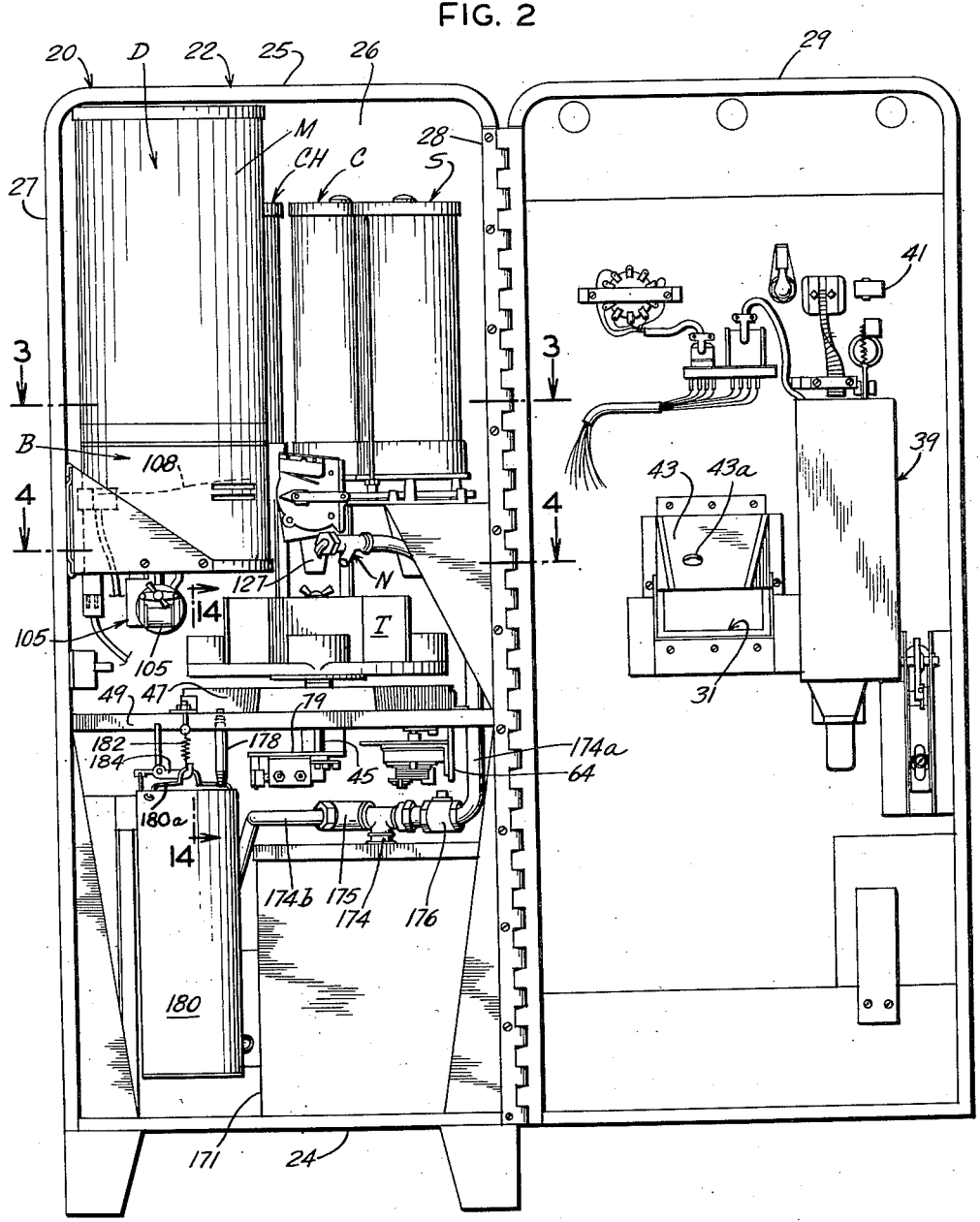
Fig. 2 is a front elevational view of the machine shown in Fig. 1, with the door of the cabinet thereof in open position.

A beverage dispensing machine 20, embodying the principles of my invention, is shown in the drawings to illustrate the preferred embodiment of my invention.

Figure 3:
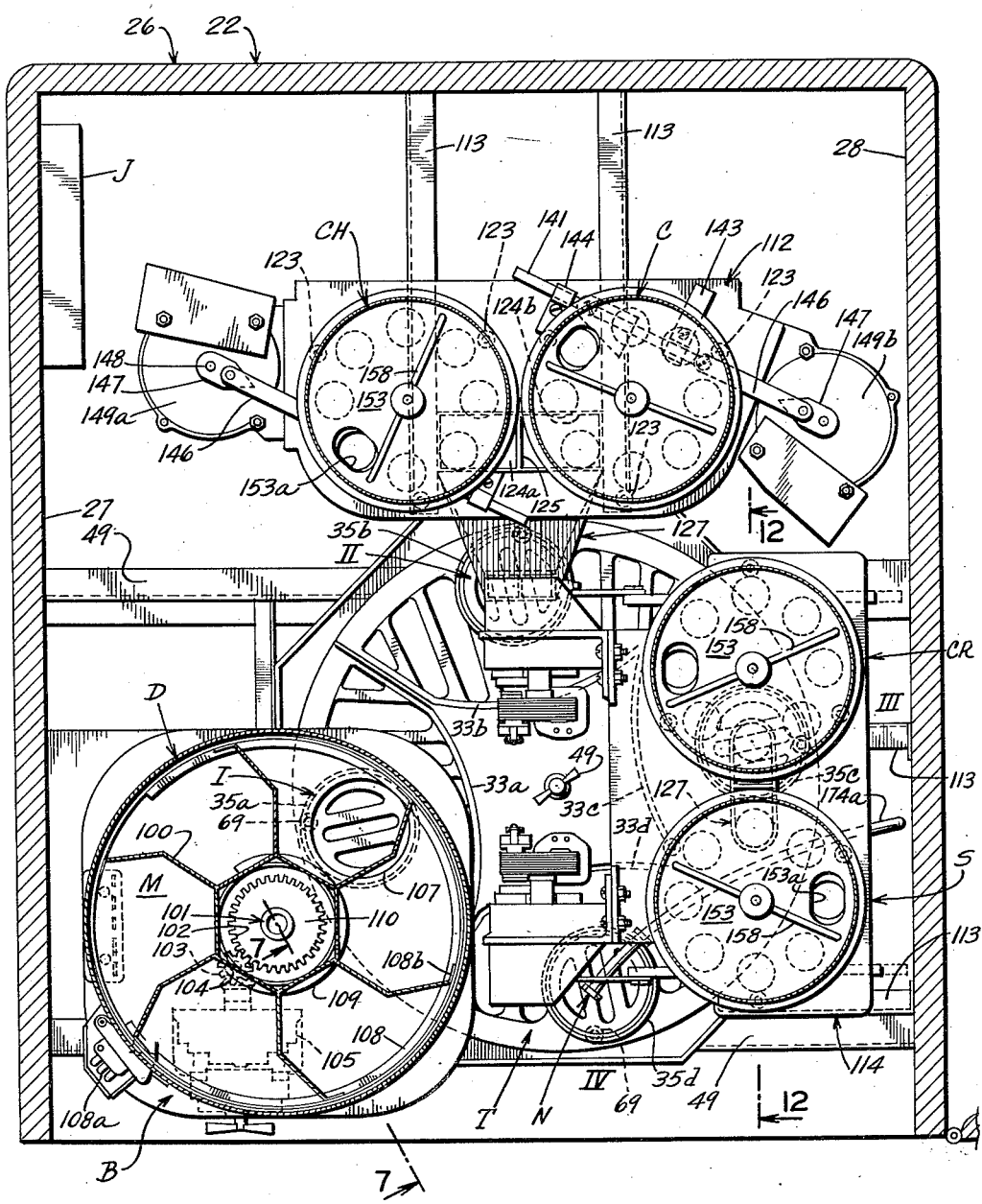
Fig. 3 is a sectional view taken substantially along the line 3—3 in Fig. 2.

The machine 20 includes a substantially upright housing or casing 22, Figs. 1, 2 and 3, which embodies a bottom wall 24, a top wall 25, a rear wall 26, two side walls 27 and 28 and a front wall or door 29 hinged along the front, vertically extending, longitudinal edge portion of the side wall 28. When the machine 20 is in operation, the door 29 is normally locked in position to close the casing 22, as shown in Fig. 1.

The machine 20 comprises, in general, Figs. 2 and 3, a turntable T and dispensing mechanism, including, cup dispensing mechanism D, chocolate dispensing mechanism CH, coffee dispensing mechanism C, cream dispensing mechanism CR, sugar dispensing mechanism S, and a fluid dispensing nozzle N, arranged around the turntable T. In general, in the operation of my novel machine 20, a cup is dropped in upright position on the turntable T by the cup-drop mechanism or cup dispenser D, and is then fed successively past the chocolate dispenser CH, the coffee dispenser C, the cream dispenser CR, and the sugar dispenser S, into position below the nozzle N, at the front of the machine 20, in which latter position it is accessible to the customer through an access opening 31 in the door 29.

Figure 14:
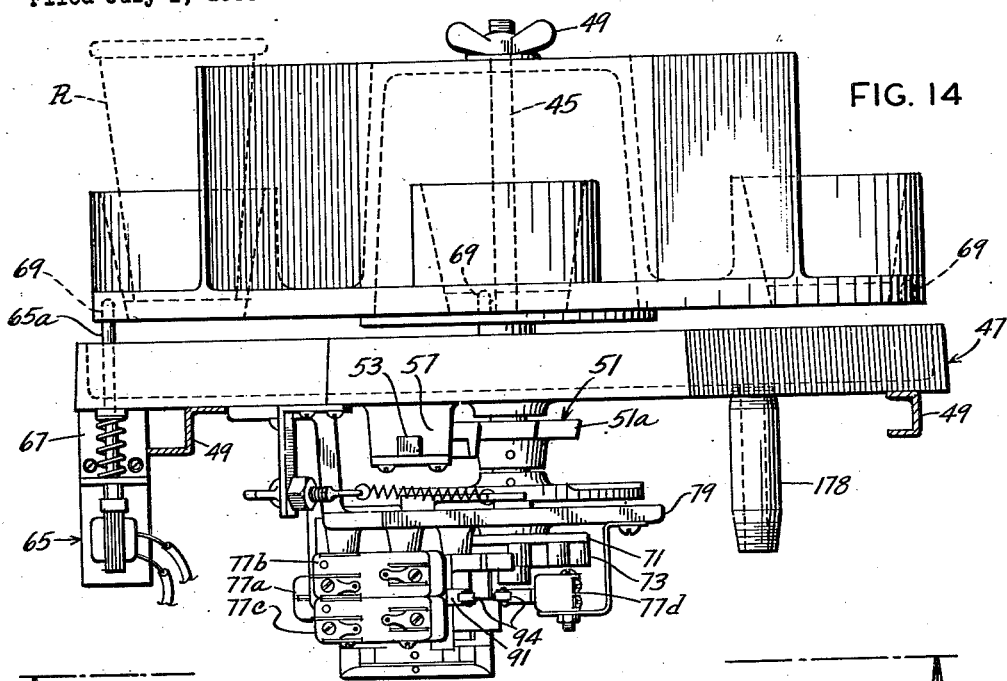
Fig. 14 is a detail elevational view of a portion of the mechanism shown in Fig. 2.

The upper surface of the turntable T is divided into four quadrants by four substantially semi-circular shaped walls 33a, 33b, 33c, and 33d disposed thereon in upright position, Figs. 2, 4 and 14. The walls 33a–d are preferably of sufficient height to insure that a person reaching in through the access opening 31 cannot reach into any quadrant other than the quadrant disposed adjacent to the opening 31. A substantially annular shaped cup receiving receptacle 35a, 35b, 35c and 36d, Figs. 4 and 14, is disposed in each of the respective quadrants on the upper surface of the turntable T.

When the turntable T is disposed in normal, at rest position, the four receptacles 35a–d are each disposed at one of four positions or stations I, II, III, and IV in the machine 20, Fig. 3. The receptacles 35a–d are so positioned on the turntable T that, when any one of them is disposed at station I: it is disposed below and adjacent to the cup drop mechanism D in position to receive a cup from the latter; another one of the receptacles is disposed at station II, below and adjacent to the chocolate dispenser CH and the coffee dispenser C, in such position that, if either chocolate or coffee is dispensed by those dispensers, it will drop into a cup in that receptacle; another one of the receptacles is disposed at station III, below and adjacent to the cream dispenser CR and the sugar dispenser S, in such position that, if either cream or sugar is dispensed by those dispensers, it will drop into a cup in that receptacle; and another one of the receptacles is disposed at station IV, at the front of the machine 20, in such position that, if fluid is discharged from the nozzle N, it is received in the cup in that receptacle, which is accessible to a customer through the access opening 31.

A selector switch SW, Figs. 1 and 18, is mounted on the front face of the door 29 and embodies a manually operable knob or handle, in the form of a pointer 37, which may be selectively moved by a customer to a position indicating, on indicia I on a plate P, the selection of hot chocolate, black coffee, coffee with cream, coffee with sugar, or coffee with cream and sugar, respectively, Fig. 1.

A coin receiving mechanism 39 is mounted on the rear face of the door 29, Fig. 2, and has the usual coin receiving slot 39a and coin return slot or opening 39b disposed in the front face of the door 29. The usual "coin return" button 39c is mounted on the front face of the door 29.

A manually operated switch 41 is mounted on the rear face of the door 29, Fig. 2, and has a manually operated push button 41a disposed in the front face of the door 29, Fig. 1.

In general, in the operation of my novel machine, a customer deposits a coin, or coins, of the proper denomination, in the coin receiving slot 39a, and turns the pointer 37 on selector switch SW to the indicia indicating the beverage which he selects to be dispensed. In the operation of the machine, it does not matter whether he turns the pointer 37 first, or deposits the money in the coin slot 39a first. After having both deposited the money in the coin slot 39a, and turned the pointer 37 to the proper indicia, the customer then pushes the push button 41a to thereby close the switch 41, and initiate a cycle of operation of my novel machine, as will be discussed in greater detail hereinafter. During the cycle of operation of the machine 20, a cup, which has been deposited by the cup drop mechanism D into the receptacle disposed at station I during the preceding cycle of operation, is first advanced by the turntable T from station I to station II. When the cup arrives at station II, the turntable stops and either powdered chocolate or powdered coffee, depending upon the selection of the customer, is deposited by the respective dispenser CH or C into the cup disposed at station II. The cup is then advanced by the turntable T to station III, in which position the turntable T again stops. If black coffee has been selected by the customer, no dispensing operation occurs when the cup is disposed at station III. If the customer had previously chosen hot chocolate, powdered cream is dispensed by the dispener CR into the cup at this station. If the customer has chosen coffee with cream, coffee with sugar, or coffee with cream and sugar, the cream or sugar, or both, as selected, is dispensed by the respective dispensers CR and S into the cup at this station. The turntable T then advances the cup from station III to station IV, where it again stops and hot water is fed into the cup at this station through nozzle N, Fig. 2. The cup of beverage is then ready to be removed by the customer through access opening 31. While the turntable T is disposed in this latter position, wherein water is fed from the nozzle N into the cup disposed at station IV, another cup is deposited by the cup drop mechanism D into the receptacle then disposed at station I, in position to be similarly moved by the turntable T during the next beverage vending cycle of operation of the machine 20.

A canopy 43 is mounted on the rear face of the door 29, Fig. 2 over the upper portion of the access opening 31. The canopy 43 is so disposed relative to the turntable T that cups being advanced from station III to station IV may pass thereunder, but that the canopy 43 and the adjacent ones of the walls 33a–d prevent a customer from reaching through the access opening 31 into any quadrant of the turntable T except the quadrant disposed adjacent to the opening 31. A hole 43a, Fig. 2, is afforded in the canopy 43 in alignment with the nozzle N so that the water from the nozzle N passes downwardly through the opening 43a into the cup disposed at station IV during that portion of the cycle of operation.

In the construction of my novel machine 20, the turntable T is removably mounted on the upper end portion of a shaft 45 which is journalled in substantially vertical position in a drain plate 47, Figs. 2 and 5. The drain plate 47 is mounted on suitable supporting brackets 49 extending between and attached to the side walls 27 and 28 of the housing 22.

The shaft 45 has a plate 45a mounted thereon, for rotation therewith, above the drain plate 47. The turntable T rests on the plate 45a and is releasably secured in position thereon by suitable means such as a nut 49 threaded on the shaft 45 and clamping the turntable T against the plate 45a, Fig. 5.

The lower end portion of the shaft 45 projects downwardly below the drain plate 47, and a ratchet wheel 51 is mounted on the shaft 45, Figs. 14 and 17. A slide rod 53, Figs. 14, 15, 16 and 17 having a pawl 54 thereon is slidably mounted in brackets 56 and 57. One end portion of the slide rod 53 is connected by a link 59 to an eccentric plate or crank 61 mounted on the drive shaft 63a of a motor 63, Figs. 16 and 17. The motor 63 is mounted on the lower face of the drain plate 47 by a suitable bracket 64, Fig. 15. The ratchet wheel 51 has four equally spaced teeth 51a therein, and the pawl 54 is so disposed on the slide rod 53 that during the return stroke of the slide rod 53, toward the motor 63, the pawl 54 engages a tooth on the ratchet wheel 51 to thereby turn the turntable T one-quarter of a revolution in a clockwise direction as viewed in Fig. 3.

A solenoid 65 having a plunger 65a is mounted on a bracket 67 below the drain plate 47 in such position that the plunger 65a thereof extends upwardly through the drain plate 47 into position to engage in any one of four holes 69 in the turntable T, Figs. 4 and 14. The four holes 69 in the turntable T, Fig. 3, are so positioned therein that when the turntable T is stopped in normal, at rest position, with the receptacles 35a-d disposed at any one of the stations I–IV, the plunger 65a is disposed in vertical alignment with one of the holes 69. During the operation of my novel machine 20, the solenoid 65 is actuated in timed relation to the operation of the motor 63 to withdraw the plunger 65a from engagement with one of the holes 69 to thereby permit the turning of the turntable T through the next quarter of a turn by the slide rod 53, and the solenoid 65 is then de-energized to permit the spring urged plunger 65a to move upwardly into engagement with the bottom face of the turntable T so that, when the next opening 69 comes into alignment with the plunger 65a at the close of that quarter turn of the turntable T, the plunger 65a may snap into that opening 69 to thereby positively stop the turntable in predetermined position. This operation is repeated during each advancing movement of the turntable T.

Figure 15:
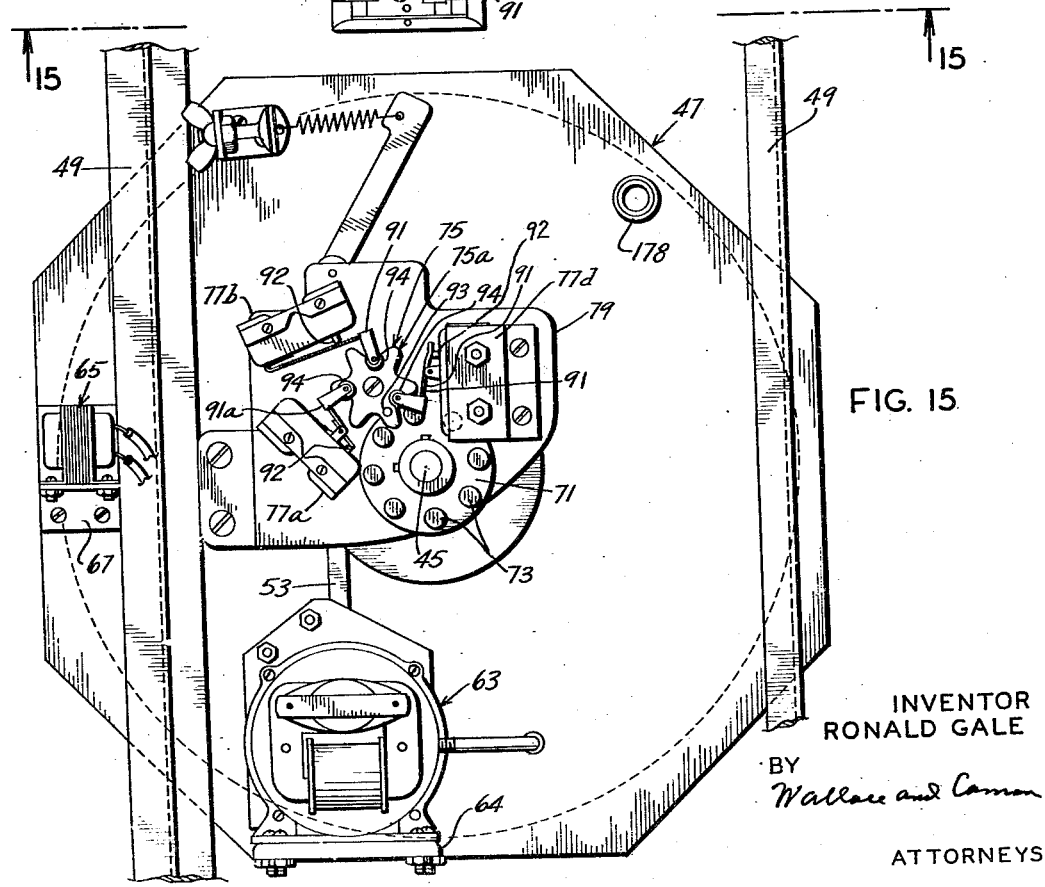
Fig. 15 is a bottom plan view of the mechanism shown in Fig. 14.

A circular-shaped plate or wheel 71 is mounted on the lower end portion of the shaft 45 for rotation therewith, below the ratchet wheel 51, Figs. 14 and 15. A plurality of equally and annularly, spaced pegs 73 project downwardly from the lower face of the wheel 71 and mesh with the teeth 75a on a gear 75, Fig. 15.

Four switches 77a, 77b, 77c, and 77d are mounted on a bracket 79 depending from the drain plate 47. Each of the switches 77a and 77d has a respective actuating arm 91 in the form of a leaf spring projecting therefrom. The switches 77b and 77c are mounted in stacked position to afford a double switch, and embody a common actuating arm 91a. The arm 91 or 91a on each switch 77a–d is disposed over a pushbutton 92 in such position that inward deflection of the arm 91 or 91a from normal position is effective to actuate the respective switch 77a, 77d, or 77b–c. Each arm 91 has a roller 94 mounted on the free end portion thereof.

A pin 93 is mounted on and projects downwardly from the gear 75. The ratio of the number of teeth 75a on the gear 75 to the number of pegs 73 on the wheel 71 is such that during the three-quarters of a complete revolution of the turntable T necessary to move a receptacle 35a–d from station I to station IV, the gear 75 is rotated through a complete rotation.

The switches 77a–d are mounted on the bracket 79 in such position that the rollers 94 are disposed in the path of travel of the pin 93 on the gear 75. Hence, as the pin 93 moves past the switches 77a–d, the latter are actuated thereby. The positioning of the pin 93 relative to the switches 77a–d is such that during the movement of a cup from station I to station II the pin 93 moves past the roller 94 on the switch 77a; during the movement of the cup from station II to station III the pin 93 moves past the roller 94 on the switches 77b and 77c; and during the movement of the cup from station III to station IV the pin 93 moves past the roller 94 on the switch 77d.

As will be discussed in greater detail hereinafter, the switch 77a is in the control circuits for the chocolate dispenser CH and the coffee dispensers C; the switches 77b and 77c are a double switch in the control circuits for the cream dispenser CR and the sugar dispenser S, respectively; and the switch 77d is a single switch in the control circuit for the cup dispenser D. Hence, it will be seen that as the cup moves from station I to station II the chocolate and coffee dispenser switch 77a is closed and then opened; as the cup moves from station II to station III the cream and sugar dispenser switches 77b and 77c are closed and then opened; and during the movement of the cup from station III to station IV the cup drop dispenser switch 77d is actuated. Such actuation of the switches 77a–d is effective to initiate actuation of the cup dispenser D during each cycle of operation of my novel machine 20, and to initiate actuation of selected ones of the chocolate dispenser CH, coffee dispenser C, cream dispenser CR and sugar dispenser S, in accordance with the beverage selection made by the customer in the positioning of the pointer 37 on the selector switch SW. Actuation of the switch 77d, through its initiation of operation of the cup dispenser D, is also effective to initiate actuation of the control circuit for the water dispensing mechanism and thereby cause water to flow from the nozzle N into the cup disposed at station IV in the last portion of the cycle of operation of my machine, as will be discussed in greater detail presently.

The cup dispensing mechanism D, which I prefer to use in my novel machine 20, is available on the market and is of the type wherein a supply of suitable receptacles such as paper cups R, in a plurality of annularly disposed stacks, is carried in a magazine M mounted on a base B, Figs. 2 and 3. A spider 100, Fig. 3, is rotatably mounted in the magazine M for rotation with a shaft 101, journalled in the base B. Each individual stack of cups may be disposed in a respective compartment in the spider 100. A gear 102, Fig. 3, is mounted on the shaft 101 for rotation therewith, and is meshed with a gear 103 mounted on a shaft 104 which is journalled in, and projects downwardly from, the base B, Figs. 3 and 4.

A motor 105 is mounted on the base B in depending relation thereto, Figs. 2, 3 and 5 and the drive shaft 105a thereof is connected by gears 106 and 106a to the shaft 104, Fig. 5.

The base B is substantially cup shaped, and embodies a chute 107 in the bottom thereof disposed in position whereby when a cup is discharged through the chute 107 it is dropped thereby onto the turntable T at station I.

Two elongated ejector cams 108 and 109 are mounted in the base B. The cam 108 is in the form of two track members 108a and 108b disposed in overlapping relation, Figs. 3 and 9. The leading edge of the track member 108a or, in other words, the end thereof which is furthest removed from the track member 108b is disposed substantially diametrically opposite to the chute 107, Fig. 3. The upper face of the track member 108a slants upwardly, Fig. 9, from the leading edge thereof to the position in which it is overlapped by the leading edge of the track member 108b. At the leading edge of the track member 108a, the upper surface thereof is disposed at a level wherein, as the lowermost cup in a stack being moved along the bottom of the base B by the spider 100 in a counterclockwise direction, as viewed in Fig. 3, toward the leading edge of the track member 108a, the rim of the cup rides onto the upper face of the track member 108a. As the stack of cups is advanced by the spider 100 toward the track member 108b the outer rim of the lowermost cup rides on the upper face of the track member 108a into position under the leading edge of the track member 108b. The cups disposed above this lowermost cup, ride upwardly onto the upper face of the track member 108b.

The lower face of the track member 108b slants downwardly, Fig. 9, from the position at which it overlaps the track member 108a to the position immediately above the chute 107. As the spider 100 is moved in the base B the lowermost cups in the respective stacks are successively fed upwardly onto the track member 108a and beneath the track member 108b. As each lowermost cup is moved into position vertically above the chute 107 it drops downwardly therethrough onto the turntable T disposed therebeneath.

The ejector cam 109 is constructed similarly to the cam 108 and embodies two track members 109a and 109b mounted around the central hub portion 110 of the base B. The leading edge of the track member 109a is disposed substantially radially inwardly from the leading edge of the track member 108a and when the lowermost cup rides upwardly onto the track member 108a it likewise rides upwardly onto the track member 109a. As the lowermost cups ride under the leading edge of the track member 108b they likewise ride under the edge of the track member 109b, and the cups disposed thereabove ride onto the upper face of the track member 109b. The lower face of the track member 109b tapers downwardly in parallel relation to the lower face of the track member 108b.

Hence it will be seen that as the stacks of cups R are moved around the base B by the spider 100, each successive lowermost cup is fed downwardly under the track members 108b and 109b and discharged through the chute 107, and the cups disposed thereabove ride around on the upper faces of the track members 108b and 109b so that only the lowermost cup in each stack is thus discharged into the chute 107.

A cam 113 is mounted on the outer end portion of the drive shaft 105a of the motor 105, and a switch 115 is mounted on a bracket 116 beneath the base B of the cup dispenser D in position wherein the outer end portion of an actuating member 115a on the switch 115 rides on the periphery of the cam 113 during operation of the motor 105. The configuration of the cam 113 is such that, shortly after the initiation of the operation of the motor 105, the cam 113 depresses the actuating member 115a to thereby depress a pin 115b on the switch 115 and actuate the switch 115. Shortly before the completion of an operating cycle of the cup dispenser D, the actuating member 115a rides down off from the lobe 113a of the cam 113 to thereby return the switch 115 to normal condition.

Another cam plate 117, Figs. 5 and 11, is mounted on the shaft 104 for rotation therewith, below the base B. A pin 117a is mounted on the lower face of the cam plate 117 in position to engage the actuating member 118a on a switch 118 and thereby actuate the switch 118 during the closing portion of a cycle of operation of the motor 105, for a purpose which will be discussed in greater detail hereinafter.

The ratio of the gearing between the shaft 101 in the cup drop mechanism D, and the drive shaft 105a of the motor 105, and the configuration and arrangement of the cams 113 and 117, is such that, at the initiation and completion of the cycle of operation of the cup dispenser D, the cams 113 and 117 are disposed in the positions shown in Figs. 10 and 11, and during a cycle of operation of the cup dispenser D, the motor 105 rotates the gear 101 and, therefore, the spider 100 a sufficient distance in a counterclockwise direction, as viewed in Fig. 3, to advance the stacks of cups in the magazine M a sufficient distance to advance one stack into position wherein the lowermost cup thereof is discharged downwardly through the chute 107.

As is best seen in Fig. 3, the chocolate dispenser CH and the coffee dispenser C are mounted on a bracket 112, and the cream dispenser CR and the sugar dispenser S are mounted on a bracket 114. These brackets 112 and 114 are mounted in the housing 22 by mounting brackets 113.

Each of the dispensers CH, C, CR, and S, Figs. 3, 12 and 13, embodies a base plate 122 mounted on the respective brackets 112 or 114. Each of the brackets 112 or 114 has a centrally disposed opening 124 having a partition wall 125 therein dividing the opening 124 into two sections 124a and 124b. A chute 127, Figs. 2 and 12, is mounted on the respective bracket 112 or 114 in alignment with the opening 124 and, like the opening 124 is divided by a partition wall 128 into two sections 127a and 127b. The sections 127a and 127b of the chutes 127 are disposed in alignment with the sections 124a and 124b, respectively, of the respective opening 124.

Each of the bottom plates 122 of the dispensers CH, C, CR and S rests on bosses 123 on the respective brackets 112 or 114 and is secured against horizontal movement relative thereto by pins 126 carried by the plates 122 and removably mounted in the bosses 123, Figs. 3, 12 and 13. Each plate 122 has an opening 131 formed therethrough and the plate 122 is disposed on the bracket 112 or 114 in such position that the passageway 131 is disposed in vertical alignment with a respective one of the sections 124a or 124b of the openings 124. In each of the dispensers, a shaft 133 is journalled at its lower end portion in the respective bracket 112 or 114 and has a ratchet wheel 135 mounted thereon for rotation therewith. The ratchet wheel 135 rests on a boss 137, which projects upwardly from the bracket 112 or 114, below the plate 122, and is disposed in the path of travel of a pawl 139 mounted on a slide rod 141 which is slidably mounted in brackets 143 and 144 on the respective bracket 112 or 114. The slide rod 141 of the dispenser is connected by a link 146 to a crank 147, Fig. 3, mounted on the drive shaft 148 of the motor 149a, 149b, 149c or 149d of that respective dispenser CH, C, CR, or S. Holding pawls 150 are mounted on the plates 122 in position to engage the ratchet wheel 135 and prevent reverse rotation thereof, Fig. 13.

Each dispenser CH, C, CR and S embodies a perforated plate 151 mounted on a knurled portion of the shaft 133 with a press fit, above the base plate 122, Fig. 12. The plate 151 is rotatable with the shaft 133, and the perforations 151a therein are disposed in annularly spaced relation around the plate 151 in position to be moved successively past the passageway 131 in the plate 122 during rotation of the plate 151 with the shaft 133. There are the same number of perforations 151a in the plate 151 as there are teeth 135a on the ratchet wheel 135, Fig. 13. The perforations 151a are of substantially the same size as the passageway 131, and are so disposed relative to each other that one is advanced into alignment with the passageway 131 during each reciprocation of the slide rod 141, the pawl 139 being effective to rotate the shaft 133 one step during each reciprocation of the slide rod 141.

Each dispenser CH, C, CR and S also embodies an upper base plate 153 disposed above, and in substantially parallel relation to, the plate 122. The top plate 153 has an annular flange 155 thereon, the lower edge portion of which rests on the plate 122. The upper edge portion of the flange 155 has an inwardly disposed shoulder 155a formed thereon, and a substantially cylindrical shaped container 157 is mounted in the flange 155, in snug fitting relation thereto, and rests on the shoulder 155a. The container 157 has a removable top 157a thereon, and affords the storage space for the main bulk of the powdered ingredient to be dispensed by that dispenser.

The plate 153 has an opening 153a therein, which is somewhat larger than any one of the openings 151a. The opening 153a is preferably so disposed in the plate 153 that it is disposed in vertical alignment with the opening 151a disposed two advancing movements back from the opening 151a disposed in alignment with the respective opening 131, Figs. 12 and 13.

Hence, it will be seen that as the plate 151 is rotated under the plate 153, beverage powder may flow from the container 157 downwardly through the opening 153a onto the plate 151 and into the openings 151a therein. The openings 151a, as they are advanced toward alignment with the openings 131 in the plate 122, advance the powder trapped therein and, as they are aligned with the opening 131, the powder therein is discharged downwardly through that opening 131 and through the respective sections 124a or 124b, and 127a or 127b of the opening 124 and the chutes 127, respectively. An agitating bar 158 is mounted on each shaft 133, above the plate 155, Figs. 12 and 13, and is rotatable with the shaft 133 to thereby agitate the powdered ingredient in the container 157 and insure free flow.

In servicing the dispensers CH, C, CR and S, the container 157, bar 158, plates 122, 151, and 153, shaft 133 and ratchet wheel 135, may be lifted as a unit from the brackets 112 and 144, for cleaning and refilling, and may then be readily reinstalled into position on the brackets 112 and 114.

Each of the dispensers CH, C, CR and S embodies, Figs. 12 and 19, a respective vending switch 161a, 161b, 161c, and 161d, respectively, and a relay switch 163a, 163b, 163c, and 163d, respectively, which are connected to the respective motor 149a–d and the respective switch 77a–c, and which, together with other switches embodied in my novel machine 20 are effective to afford efficient selective control of the operation of my novel machine as will be discussed in greater detail presently. The swtiches 161a–d are mounted on the brackets 112 and 114 adjacent the respective motors 149a–d, Fig. 12, and the switches 163a–d are mounted in a junction box J mounted on the wall 27 within the cabinet 22, Fig. 3.

A water reservoir 171, Fig. 2 is mounted on the bottom wall 24 of the housing 22 and may be connected at the bottom, by a connection, not shown, to the normal commercial water supply. A heater coil 173, Fig. 19, is embodied in the reservoir 171, to heat the water flowing thereinto. An outlet conduit 174 is mounted on the top of the reservoir 171, and is connected through a solenoid valve 176 and another conduit 174a to the nozzle N. A relief valve 175, of the pressure and temperature responsive type, is connected to the conduit 174 and, through a conduit 174b, to the connection, not shown, of the reservoir 171 to the commercial water supply, and is effective to vent the reservoir 171 back to the water supply in the event that the pressure or temperature in the reservoir 171 becomes too high.

A drainpipe 178, Figs. 2 and 5, is mounted in the drain plate 47 in position to drain into a can 180 supported by a spring 182 from one of the cross braces 49. A lever 184 fulcrumed at its center has one end portion disposed under the bale 180a of the pail 180 and the other end thereof connected to a normally closed switch 186, Fig. 19. It will be seen that in the event of excessive overflow onto the drain plate 47, the excess liquid will drain therefrom through the pipe 178 into the pail 180. The spring 182 is of such strength that until the pail 180 is filled to a dangerous level, it is effective to support the pail 180 in raised position. However, when the level of liquid in the pail 180 rises to a dangerous height the weight thereof becomes sufficiently great to extend the spring 182 to a position wherein the lever 184 is rocked by the pail 180 into a position to open the switch 186. The switch 186 is in the main power line to the machine 20, Fig. 19, and, therefore, all the power to the machine is thereby cut off.

Figure 19:
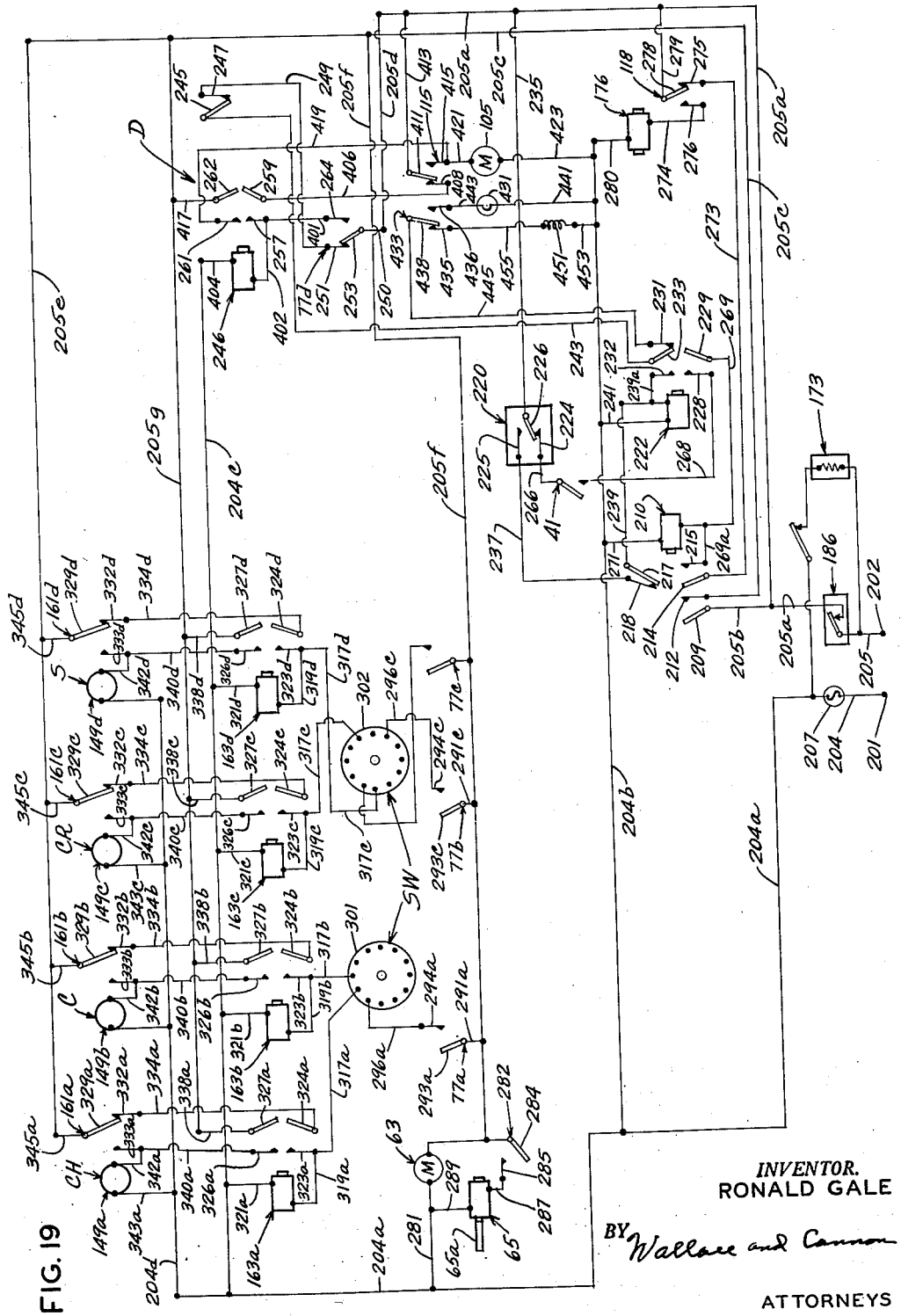
Fig. 19 is a diagrammatic illustration of the wiring embodied in my novel beverage dispenser shown in Fig. 1.

In Fig. 19, the wiring of my novel beverage vending machine 20 is diagrammatically illustrated. In this drawing, the connections by which the machine 20 is connected to a normal electric power source are indicated at 201 and 202. Two power lines 204 and 205 extend into the machine 20 from the power connections 201 and 202.

A fuse 207 is connected at one side to the power line 204 and that power line continues from the other side of the fuse 207 as power line 204a.

The other power line 205 is connected to one side of the normally closed safety switch 186. This power line continues from the other side of the switch 186 as power line 205a.

Another line 205b branches from the power line 205a and is connected to the one blade 209 of a master relay switch 210. The blade 209 is normally in open position wherein it is disposed out of engagement with the contact 212 of the master relay 210. However, when the master relay 210 is energized the blade 209 is moved into engagement with the contact 212 and, when this happens, the branch line 205b is connected through the blade 209 and the contact 212 to a line 205c. Hence, when the master relay 210 is energized the line 205c constitutes an auxiliary power line connected in parallel to main power line 205a.

The master relay 210 embodies two additional switches, namely, a switch consisting of a blade 214 which is normally disposed in open position relative to a contact 215, and a switch consisting of a blade 217 which is normally disposed in closed position relative to a contact 218. The master relay may be positioned in any suitable location in the housing 22 but I prefer to mount it in the junction box J.

The coin receiving mechanism 39, Figs. 1 and 2 may be of any suitable type such as the type disclosed in the United States Reissue Patent No. Re. 21,301 issued to B. W. Fry et al. on December 19, 1939, and embodies the usual so-called vending switch 220, Fig. 19. An anti-jackpot relay 222, mounted in the junction box J, is connected to the switch 220, Fig. 19, as will be discussed in greater detail presently.

The vending switch 220 embodies two contacts 224 and 225, and a blade 226 movable between the contacts 224 and 225 and normally engaged with the contact 224.

The anti-jackpot relay embodies two switches, namely, a switch consisting of a contact 228 and a blade 229 normally disposed in open position relative to the contact 228, and a switch consisting of two contacts 231 and 232 and a blade 233, movable between the contacts 231 and 232, and normally engaged with the contact 231.

The master relay 210 and the anti-jackpot relay 222 are normally not energized.

In the operation of my novel machine, the customer turns the pointer 37 of the selector switch SW to indicate the beverage selected and drops a coin into the coin slot 39a. When the coin is dropped into the slot 39a the blade 226 of the switch 220 is actuated thereby so it is moved out of engagement with the contact 224 and into engagement with the contact 225. When this occurs, a circuit is completed from the main power line 205a through a line 235, the blade 226 of the vending switch 220, the contact 225, a line 237, the contact 218 of the master relay 210, the normally closed blade 217, a line 239, the winding of the anti-jackpot relay 222, a line 241, and a line 204b back to the other main power line 204a.

The closing of this circuit causes energization of the anti-jackpot relay 222 and thereby causes the blade 233 to be pulled into engagement with the contact 232. This energizes the holding circuit for the anti-jackpot relay 222.

The holding circuit for the anti-jackpot relay 222 extends from the power line 204a through the line 204b, the line 241, the winding of the anti-jackpot relay 222, the line 239, a line 239a, the contact 232, the blade 233, a line 243, a blade 245 of a relay switch 246 mounted in the junction box J, but embodied in the cup dispenser mechanism D, a contact 247 with which the blade 245 is normally engaged, a line 249, a contact 251 of the switch 77d embodied in the cup dispenser D and which, it will be remembered is disposed below the drain plate 47, a blade 253 of the switch 77d normally engaged with the contact 251, a line 250, and a line 205d back to the other main power line 205a. Hence, it will be seen that the vending switch 220 and the master relay 210 are removed from the circuit necessary to maintain the anti-jackpot relay 222 energized.

The cup dispenser relay switch 246, in addition to the normally closed switch, comprising the blade 245 and the contact 247, embodies two additional switches, namely, a switch consisting of a contact 257 and a blade 259 normally disposed in open position relative thereto, and a switch consisting of a contact 257 and a blade 259 normally disposed in open position relative thereto, and a switch consisting of a contact 261 and a blade 262 normally disposed in open position relative thereto.

The cup dispenser switch 77d in addition to the contact 251, embodies a second contact 264, and the blade 253, which will be remembered is normally engaged with the contact 251, is movable between the contacts 251 and 264.

The passage of the coin through the coin receiving mechanism 39 is only effective to close the blade 226 of the vending switch 220 on the contact 225 for a short period of time. This momentary closing of the blade 226 on the contact 225 of the switch 220 is sufficient to energize the anti-jackpot relay 222 and effect closing of the holding circuit therefor as previously described. As the coin passes on through the coin receiving mechanism 39, the blade 226 of the vending switch 220 is permitted to move out of engagement with the contact 225 and move back into its normally closed position relative to the contact 224.

It will be noted that although the anti-jackpot relay 222 closed upon insertion of the coin in the slot 39a, the master relay 210 cannot be energized until the anti-jackpot relay has been energized, and, in addition, the manually operated switch 41 has been closed. Hence, after the anti-jackpot relay 222 has been energized by the insertion of the proper coin into the coin slot 39a, the customer pushes the push button 41a to thereby close the switch 41 to thereby complete the circuit necessary to energize the master relay 210. This circuit extends from the power line 205a, through the line 235, the blade 226, of the vending switch 220, the contact 224, a line 266, the switch 41, a line 268, the contact 228 of the anti-jackpot relay 222, the blade 229 now engaged with the contact 228, a line 269, the winding of the master relay 210, a line 271, and the line 204b back to the other power line 204a.

The energization of the master relay 210 is effective to move the blade 217 into open position relative to the contact 218. This breaks the connection from the contact 225 of the vending switch 220 to the anti-jackpot relay 222. Hence, while the master relay 210 remains energized, the dropping of additional coins into the coin slot 39a will be ineffective to initiate another cycle of operation of the machine and the coins are returned by the coin receiving mechanism 39 to the customer.

Energization of the master relay 210 is also effective to close the normally open switch thereof embodying the blade 209 and the contact 212, and to close the other normally open switch thereof embodying the blade 214 and the contact 215. It will be remembered that closure of the blade 209 on the contact 212 of the master relay 210 is effective to connect the auxiliary power line 205c to the branch power line 205b and, therefore, to the main power line 205a.

The closure of the blade 214 on the contact 215 of the master relay 210 is effective to close a holding circuit for the master relay 210 which is independent of the vending switch 220. This holding circuit extends from the power line 204a through the line 204b, the line 271, the winding of the master relay 210, the line 269, a line 269a, the contact 215 of the master relay 210, the blade 214, a line 273, a contact 275, of the cam operated switch 118 on the cup drop dispenser D, the blade 278 of the switch 118 and which is normally disposed in closed position relative to the contact 275, and a line 279 back to the other main power line 205a. It will be seen that, with this holding circuit, the master relay 210 will remain energized during normal operation of my novel machine 20 until the switch 118 is open. Opening of the switch 118 occurs at the end of a cycle of operation of my novel machine as will be discussed in greater detail presently.

The energization of the master relay 210, and the closure of the blade 209 thereof on the contact 212, it will be remembered, is effective to connect the auxiliary power line 205c to the main power line 205a. This connection of the auxiliary power line 205c to the main power line 205a is effective to energize the motor 63 which drives the turntable T. This circuit through the motor 63 extends from the auxiliary power line 205c, a line 205f, the motor 63, and a line 281 back to the other main power line 204a. Hence, the turntable motor 63 is energized at all times that the master relay 210 is energized.

On each rotation of the drive shaft 63a of the turntable motor 63, the turntable T is rotated a quarter of a full revolution. The crank 61, mounted on the shaft 63a, of the motor 63, Figs. 16 and 17, is effective to close a switch 282, Figs. 16, 17 and 19, for a short period of time. Closure of the switch 282 by the crank 61 occurs during the initial portion of the return stroke of the slide rod 53, and the crank 61 permits the switch 282 to open after the slide rod 53 has completed enough of its return stroke that movement of the turntable T has initiated. The closing of the switch 282 is effective to energize the solenoid 65 to thereby withdraw the plunger 65a thereof from locking engagement with the turntable T. When the switch 282 is again permitted to open, upon release by the crank 61, the solenoid 65 is again deenergized to permit the spring loaded plunger 65a to be again pressed outwardly toward the turntable T. This occurs during movement of the turntable T so that the upper end portion of the plunger 65 engages the lower surface of the turntable T and rides therealong until the next opening 69 in the turntable moves into alignment with the plunger 65a. At that time, the plunger 65a is spring urged into the aligned opening 69 to thereby positively stop the turntable T. This occurs shortly after the pawl 54 on the slide rod 53 disengages from the tooth on the ratchet wheel 51 on the shaft 45. Hence, it will be seen that the turntable T is positively stopped in proper position at the completion of each quarter of a turn of the turntable T.

The circuit through the solenoid 65, Fig. 19, extends from the auxiliary power line 205c through the line 205f, the blade 284 of the normally open switch 282, the contact 285, a line 287, the winding of the solenoid 65, a line 289, and the line 281 back to the other power line 204a.

During the first quarter turn of the turntable T, that is, while the cup to be dispensed is moving from station I to station II, the pin 93 on gear 75 moves into and out of engagement with the roller 94 on the chocolate and coffee switch 77a, to thereby cause the switch 77a to be closed and then opened during this movement of the turntable T.

Closing of the chocolate and coffee switch 77a connects the auxiliary power line 205c to the selector switch SW. This connection is from the auxiliary power line 205c through the line 205f, a line 291a, the blade 293a of the chocolate and coffee switch 77a, the contact 294a thereof, and a line 296a, to the selector switch SW, Fig. 19.

The selector switch SW is a multiple-contact switch, Figs. 18, 18A, 18B and 19, embodying two flat discs 301 and 302 mounted on two posts 305 and 305a in substantially parallel spaced relation to each other. The discs 301 and 302 may be made of rubber, or other suitable insulating material, and each embodies an annular outer portion 301a and 302a, respectively, having a rotatably mounted central portion 301b and 302b, respectively, mounted therein. The shaft 37a on which indicator knob 37 is mounted extends through the center portions 301b and 302b of both of the discs 301 and 302 and is rotatable therewith.

Twelve contacts, numbered 1 to 12 in Figs. 18A and 18B of the drawings, are mounted on the outer portion 301a of the disc 301 in annularly spaced relation to each other adjacent to the outer edge thereof. Twelve contacts, numbered 1' to 12' inclusive, are similarly mounted on the outer portion 302a of the disc 202, with the correspondingly numbered contacts on the disc 302 being disposed in axial alignment with the correspondingly numbered contacts on the disc 301.

Each of the contacts 2 to 12, inclusive, on the disc 301, and each of the contacts 2' to 6', inclusive, and 8' to 12', inclusive, on the disc 302, embody a short, radially inwardly projecting, wiper member 303, Figs. 18A and 18B. Substantially longer wiper members 304 project radially inwardly from contact 1 on the disc 301 and from the contacts 1' and 7' on the disc 302, respectively.

A substantially arcuately shaped contact plate 306, having an outwardly extending projection 306a on one end thereof, is mounted on the center portion 301b of the disc 301 for rotation therewith. The contact plate 306 is mounted on the disc 301 in position wherein during rotation of the contact plate 306 with the shaft 37a the main body portion of the contact plate 306 is engaged with the long wiper arm 304 on contact 1, but the wiper arms 303 on the disc 301 are out of engagement therewith. The projection 306a on the contact plate 306 projects radially outwardly from the main body portion of the contact plate 306 into a position wherein during rotation of the shaft 37a the outer end portion of the projection 306a moves along an annular path effective to move the projection 306a into selective engagement with individual ones of the wiper arms 303 on the outer portion 301a of the disc 301. The contact plate 306 is of such length that it extends between six adjacent contacts on the disc 301, and the projection 306a is so disposed on the contact plate 306 that when the projection 306a is disposed in engagement with the wiper arm 303 on contact 12, the other end of the contact plate 306 is disposed opposite the wiper arm 303 on the contact 5.

Two arcuately shaped contact plates 310 and 312 are mounted on the central portion 302b of the disc 302 for rotation therewith. The contact plates 310 and 312 are spaced circumferentially from each other and each have an outwardly extending projection 310a and 312a, respectively.

The contact plate 310 is so disposed on the disc 302 and the projection 310a is so positioned thereon, that when the contact plate 306 on the disc 301 is disposed with the projection 306a engaged with the wiper arm 303 on the contact 12, the projection 310a on the contact plate 310 is disposed in engagement with the contact 6', and the opposite end portion of the contact plate 310 is disposed opposite to the contact 1'.

The contact plate 312 is so disposed on the disc 302 that when the contact plate 310 is disposed in the aforementioned position, the plate 312 is disposed with its projection 312a engaged with the wiper arm 303 on the contact 12', and the opposite end portion of the contact plate 312 is disposed opposite to the contact 7'.

During all operative movements of the knob 37 and, therefore, the shaft 37a, the long wiper arms 304 on the contacts 1, 1' and 7' are engaged with the main body portion of the contact plates 306, 310, and 312, respectively. The width of the projections 306a, 310a, and 312a is such that each projection will engage only one of the wiper arms 303 at a time.

As is best seen in Figs. 18A and 18B, contacts 8, 9, 10 and 11 on disc 301 are connected by a jumper 314; contacts 2' and 3' on disc 302 are connected by a jumper 315; and contacts 8', 10' and 12' on the disc 302 are connected by jumper 316.

The line 296a, which it will be remembered is connected at one end to the contact 294a of the chocolate and coffee switch 77a is connected at its other end to contact 1 of the selector switch SW. If the pointer 37 has been positioned by the customer to select hot chocolate, the plates 306, 310 and 312 are disposed in the position shown in Figs. 18A and 18B. Hence, when the chocolate and coffee switch 77a is closed to connect the auxiliary power line 205c to the line 296a, as previously described, the circuit thus established continues from the line 296a through contact 1 of the selector switch SW, the wiper blade 304 thereon, the contact plate 306, the projection 306a thereon, the contact 12 on the switch SW, a line 317a, a line 319a, the winding of the chocolate relay switch 163a, a line 321a, and a line 204c back to the other power line 204a, to energize the chocolate relay 163a.

The chocolate relay switch 163a embodies two normally open switches, namely a switch consisting of a contact 323a, and a blade 324a normally disposed in open position relative thereto, and a switch consisting of a contact 326a and a blade 327a normally disposed in open position relative thereto.

Energization of the chocolate relay 163a causes the blade 324a to engage the contact 323a. This closes a holding circuit for the chocolate relay 163a. This holding circuit extends from the auxiliary power line 205c, through a line 205e, a line 345a, the blade 329a in the chocolate dispenser switch 161a, a contact 332a in the switch 161a, a line 334a, the blade 324a of the chocolate relay 163a, the contact 323a, the line 319a, the winding of the chocolate relay 163a, the line 321a, the line 204c, and back to the other main power line 204a. This affords a holding circuit for the chocolate relay 163a which is closed during all the time that the blade 329 of the switch 161a is engaged with the contact 332a, and this holding circuit is independent of the chocolate and coffee switch 77a. Thus, when the chocolate and coffee switch 77a is again opened by the pin 93 moving out of engagement with the roller 94 thereof, during the first quarter turn of the turntable T, the chocolate relay 163a is not de-energized thereby.

Energization of the chocolate relay 163a also causes the blade 327a to close on the contact 326a, to thereby energize the circuit through the chocolate vending motor 149a. This circuit extends from the auxiliary power line 205c, a line 205g, a line 338a, the blade 327a of the chocolate relay switch 163a, the contact 326a, a line 340a, a line 342a, the chocolate vending motor 149a, a line 343a, a line 204d, and back to the other main power line 204a.

Actuation of the chocolate vending motor 149a causes the crank 147 thereon, Fig. 3 to be turned through a complete revolution and thereby causes the slide 141 on the chocolate dispenser CH to be moved through one complete reciprocation to thereby feed a measure of chocolate from the container 157 of the chocolate dispenser CH into the section 127a of the chute 127 thereof and thus downwardly into the cup positioned on the turntable T at station II.

Toward the close of the rotation of the crank 147 of the chocolate vending motor 149a, the end of the crank 147 actuates the blade 329a of the chocolate vending switch 161a to thereby move it out of engagement with the contact 332a and into engagement with the contact 333a thereof, Fig. 19. This movement of the blade 329a out of engagement with the contact 332a is effective to break the holding circuit to the chocolate vending relay 163a so that the blades 324a and 327a move into open position relative to the contacts 323a and 326a. The closing of the blade 329a on the contact 333a by the action of the crank 147 sets up an auxiliary circuit for the energization of the chocolate vending motor 149a, this circuit running from the auxiliary power line 205c, through the line 205e, the line 345a, the blade 329a, the contact 333a, the line 342a, the chocolate vending motor 149a, the line 343a, and the line 204d, back to the other main power line 204a. This latter circuit insures that the chocolate vending motor 149a will continue to operate for a sufficient length of time after the chocolate relay 163a is de-energized that the end of the crank 147 again moves out of engagement with the blade 329 so that the blade 329 may move back into normal engagement with the contact 332, to thereby condition the circuit of the chocolate dispenser CH for operation during the next cycle of operation if chocolate is selected by the customer.

While chocolate was being lispensed from the chocolate dispensing mechanism CH, the motor 63, below the turntable T, has continued to operate and the timing of the operation of the motor 63 is such that after the chocolate vending motor 149a is deenergized the locking solenoid 65 is again energized and the turntable T is moved a quarter of a turn to position the cup at the next station, namely station III.

During this movement of the turntable T from station II to station III, the pin 93 on the gear 75 engages the roller 94 on the cream switch 77b and the sugar switch 77c, to thereby close those switches momentarily.

It will be remembered that when the knob 37 on the selector switch SW is positioned to indicate hot chocolate, so that the projection 306a is engaged with the contact 12 on the disc 301, the projection 312a is likewise in engagement with the wiper 303 on the contact 12' on the disc 301a. Thus, closure of the cream switch 77b by the pin 93 completes a circuit through the cream relay 163c this circuit being from the auxiliary power line 205c, through the line 205f, a line 291c, the blade 293c and the contact 294c of the cream and sugar switch 77b, a line 296c, the contact 7' on the disc 302 of the selector switch SW, wiper blade 304 thereon, the contact plate 312, the projection 312a, the contact 12', the jumper 316, the contact 10', a line 317c, a line 319c, the winding of the cream relay 163c, a line 321c, and the line 204c, back to the other main power line 204a. The cream vending switch 161c, the cream vending motor 149c, and the cream relay 163c are connected in parallel to the corresponding mechanism in the chocolate dispenser CH, as best seen in Fig. 19. It will be seen that the cream dispenser CR embodies mechanism similar to that contained in the chocolate dispenser CH, and that similar parts in the cream dispenser CR are indicated in Fig. 19 with the same reference numerals as those indicating the parts of the chocolate dispneser CH but with the suffix "c" used instead of the suffix "a."

Upon energization of the cream relay 163c, the cream vending motor 149c is caused to turn the crank 147 thereof through a complete revolution to thereby cause cream to be dispensed from the cream dispenser CR and, at the close of the cream dispensing cycle, cause the cream vending switch 161c to be opened. Thus cream is dispensed into the cup when it is positioned at station III and when hot chocolate has been selected by a customer.

It will be remembered that the sugar switch 77c, beneath the drain plate 47, was closed by the pin 93 on the gear wheel 75 at the same time as the cream switch 77b was closed. However, with the pointer 37 disposed in position to select "chocolate" the contact plate 310, which is connected in the control circuit of the sugar dispenser S, Fig. 19, is disposed in position wherein the projection 310a thereon, is engaged with contact 6' which is "dead." Hence, the selector switch SW maintains an open circuit between the sugar switch 77c and the sugar relay 163d, so that the sugar dispenser S is not actuated during a chocolate-beverage vending cycle of operation.

After the cream motor 149c is deenergized by opening of the switch 161c, the motor 63, beneath the turntable T, again causes the locking solenoid 93 to be released and the turntable T to be advanced another quarter of a turn so that the cup is advanced from station III to station IV. During this movement of the turntable T, the pin 93 on the gear 75 engages the roller 94 on the cup drop switch 77d and thereby causes the blade 253 thereof to be moved out of engagement with the contact 251 and into engagement with the contact 264. The movement of the blade 253 out of engagement with the contact 251 of the cup drop switch 77d opens the previously described holding circuit for the anti-jackpot relay 222. At the same time, closure of the blade 253 on the contact 264 of the cup drop switch 77d is effective to close a circuit through the cup drop relay 246. This latter circuit extends from the power line 205a, through the line 205d, the line 250, the blade 253, the contact 264, a line 401, a line 402, the winding of the cup drop relay 246, a line 404, the line 204c, and back to the other main power line 204a.

Energization of the cup drop relay 246 is effective to pull the blade 259 into engagement with the contact 257 to provide a holding circuit for the cup drop relay 246. This circuit extends from the power line 204a, through the line 204c, the line 404, the winding of the cup drop relay 246, the line 402, the contact 257 of the cup drop relay 246, the blade 259, a line 406, a contact 408 of the switch 115 in the cup dispenser mechanism D, a blade 411 of the switch 115 and which is normally engaged with the contact 408, and a line 413 back to the other main power line 205a. It will be seen that this holding circuit for the cup drop relay 246 will remain energized until the switch 115 is opened.

Energization of the cup drop relay 246 also causes the blade 262 thereof to move into engagement with the contact 261 to thereby close a circuit through the motor 105 of the cup drop mechanism D and energize the motor 105. This circuit extends from the auxiliary power line 205c through the line 205g, a line 417, the blade 262 of the cup drop relay 246, the contact 261, a line 419, a line 421, the cup drop motor 105, a line 423, and the line 204b back to the other main power line 204a.

Early in the operation of the cup drop motor 105, the cam 113, driven thereby, Figs. 5 and 10, causes the blade 411 on the switch 115 to move out of engagement with the contact 408 and into engagement with another contact 415, Fig. 19. This disengagement of the blade 411 from the contact 408 breaks the holding circuit for the cup drop relay 246 and thereby causes deenergization of the cup drop relay 246. Deenergization of the cup drop relay 246 also causes the blade 262 thereof to disengage from the contact 261 and thereby breaks the previously described circuit to the cup drop motor 105. However, when the blade 411 of the switch 115 moves out of engagement with the contact 408, it moves into engagement with the contact 415 of the switch 115. The engagement of the blade 411 with the contact 415 provides a new circuit to the cup drop motor 105 which is effective to maintain the cup drop motor 105 energized until the lobe 113a of the cam 113 rides off from the actuating member 115a of the switch 115, Fig. 10, and again permits the blade 411 thereof to move out of engagement with the contact 415 and back into its normal engagement with the contact 408. This retaining circuit extends from the power line 205a through the line 413, the blade 411 of the switch 115, the contact 415, the line 421, the cup drop motor 105, the line 423, and the line 204b back to the other main power line 204a. This circuit insures that the cup drop motor 105 will continue operating for a sufficient length of time to cause the cam 105 to entirely release the blade 411 in the switch 115 and thereby permit the blade 411 to move back into its normal engagement with the contact 408 before the motor 105 is stopped.

During the operation of the cup drop motor 105, the spider 102 is turned thereby, as previously described, to thereby drop a cup into one of the receptacles 35a–d on the turntable T, disposed at station I. Hence, a new cup is thus disposed on the turntable T in position for use during the next beverage vending cycle of my novel machine 20.

The operation of the cup drop motor 105 is also effective to cause fluid to be discharged from the nozzle N into the cup positioned at station IV. In this operation, the pin 117a on the cam 117, driven by the cup drop motor 105, Figs. 5 and 11, engages the actuating member 118a on the switch 118, and causes the blade 278 to move out of engagement with the contact 275 and into engagement with the contact 276 thereof. This actuation of the switch 118 is effective to close a circuit through the solenoid of the solenoid valve 176, Figs. 2 and 19, mounted in the line between the reservoir 171 and the nozzle N, and controlling the discharge of fluid from the nozzle N. This circuit extends from the main power line 205a, through the line 279, the blade 278 of the switch 118, the contact 276, a line 274, the winding of the solenoid 176, a line 280, and the line 204b back to the other main power line 204a. While the cam 117 actuates the blade 278 and maintains it in contact with the contact 276 of the switch 118, the solenoid valve 176 is held open to thereby permit the fluid to flow into the cup positioned at station IV. The pin 117a is so disposed on the cam 117 that it rides along the actuating member 118a of the switch 118 for a sufficient distance, before releasing the same, that it holds the blade 278 in engagement with the contact 276 for a sufficient length of time to permit the cup disposed at station IV to be filled with fluid. At that time, the pin 117a rides off from the actuating member 118a and permits the blade 278 to again move out of engagement with the contact 276 and back into its normal engagement with the contact 275. This engagement and disengagement of the pin 117a with the actuating member 118a preferably occurs during the latter portion of a cycle of operation of the motor 105 of the cup dispenser D.

In the foregoing, an operation of my novel machine to dispense a hot chocolate drink has been described. Operation of the machine to dispense black coffee, coffee with cream, coffee with sugar, or coffee with cream and sugar, is similar except that the pointer 37 of the selector switch SW is disposed at different positions, and different ones of the dispensers CH, C, CR and S are actuated in accordance with the selection made by the customer on the selector switch SW.

It will be remembered that the mechanism in the coffee dispenser C, the cream dispenser CR, and the sugar dispenser S, is similar to that embodied in the chocolate dispenser CH. The mechanism embodied in the coffee dispenser C and the sugar dispenser S is indicated in Fig. 19 of the drawings with the same reference numerals as the similar mechanism of the chocolate dispenser CH, but with the suffix "b" and "d" used, respectively, instead of the suffix "a" used in connection with like mechanism of the chocolate dispenser CH. These dispensers C, CR and S are each connected by a separate line to the selector switch SW. Thus, it will be remembered that the chocolate dispenser CH is connected by the line 317 to contact 12 of the selector switch SW, Fig. 19. Similarly, the coffee dispenser C is connected by a line 317b to contact 11 and, by jumper 314, to contacts 8, 9, and 10 of selector switch SW; the cream dispenser CR is connected by the line 317c to contact 10' and, by jumper 316, to contacts 8' and 12' of the selector switch SW; and the sugar dispenser S is connected by a line 317d to contact 2', and, by jumper 314, to contact 3' of selector switch SW.

In the operation of the selector switch SW, when the pointer 37 is disposed in position to indicate black coffee, the projection 306a is disposed in engagement with contact 11 on the selector switch SW to thereby energize the line 317b. At this same time, the projection 312a is engaged with the contact 11', and the projection 310a is engaged with the contact 5'. Both the contacts 11' and 5' are "dead" contacts and, therefore, the connections are broken between the cream switch 77b and sugar switch 77c and the lines 317c and 317d to the cream relay 163c and the sugar relay 163d, respectively. Hence, closure of the cream switch 77b and sugar switch 77c is ineffective to cause actuation of the cream dispenser CR or the sugar dispenser S, and, therefore, neither cream nor sugar is dispensed into the cup at station III during this selected beverage vending cycle of the machine 20.

If the customer, in making his selection, has moved the pointer 37 on the selector switch SW to the coffee with cream position, the projection 306a on the contact plate 306 of the selector switch SW is thereby engaged with contact 10; the projection 312a on contact plate 312 is engaged with contact 10'; and the projection 310a on contact plate 310 is engaged with contact 4'. Contact 10 is engaged by jumper 314 to contact 11 and, therefore, when the chocolate and coffee switch 77a is closed, the latter is connected to the line 317b, and the coffee relay 163b is energized through the selector switch SW. Similarly, when the cream switch 77b and sugar switch 77c are closed, the line 317c to the cream relay 163c, is energized through the selector switch SW. However, inasmuch as the projection 310a is engaged with the contact 4', which is "dead," the contact plate 310 is ineffective to connect the line 317d from the sugar relay 163d to the cream and sugar switch 77b and, therefore, the sugar dispenser S is not actuated.

When the pointer 37 is moved by the customer to the position to indicate coffee with sugar, the projection 306a of the selector switch SW is moved into engagement with contact 9. It will be remembered that this contact is connected by jumper 314 to contact 11 and, therefore, the line 317b to the coffee relay 163b is again energized through the contact plate 306 of the selector switch SW when the chocolate and coffee switch 77a is closed. In this position of the pointer 37, the projection 312a is engaged with contact 9' of the selector switch SW which is a "dead" contact and, therefore, the contact plate 312, which controls the circuit to the line 317c connected to the cream relay 163c is ineffective to connect the cream relay 163c to the cream switch 77b. The projection 310a on the contact plate 310 however, is engaged at that time with the contact 3' of the selector switch SW. It will be remembered that the contact 3' is connected by the jumper 314 to the contact 2' which is connected by the line 317d to the sugar relay 163d. Hence, the sugar relay 163d is connected through the selector switch SW to the cream and sugar switch 77b, and upon closure of the latter, the operation of the sugar dispenser S is initiated.

If the customer moved the pointer 37 to the position on the selector switch SW indicating coffee with cream and sugar, the projection 306a on the contact plate 306 is then positioned in engagement with contact 8 on the selector switch SW which is also connected by the jumper 314 to contact 11 and, therefore, connected by the line 317b to the coffee relay 163b so that a dispensing operation of the coffee dispenser C is initiated upon closure of the chocolate and coffee switch 77a. At this same time, the projection 312a is engaged with the contact 8' of the selector switch SW and is thus connected by the jumper 315 to the contact 10', and, by the line 317c, to the cream relay 163c. In this position of the switch SW, the projection 310a is engaged with contact 2' of the selector switch SW and, therefore, by the line 317d to the sugar relay 163d. Hence, the cream switch 77b and the sugar switch 77c are connected through the contact plates 312 and 310 to the cream relay 163c and the sugar relay 163d, respectively, and upon closing of the cream and sugar switches 77b–c, operation of the cream dispenser CR and the sugar dispenser S is initiated to thereby dispense both cream and sugar into the cup when the latter is disposed at station III.

Thus it will be seen that my novel machine is effective in a novel and expeditious manner to control the selective vending of a plurality of different beverages at the choice of a customer.

Although I have, herein, discussed the operation of my novel machine as vending only a hot beverage, it will be appreciated by those skilled in the art that cold beverages such as, for example, chocolate milk, and the like, may be dispensed from this machine without departing from the purview of my invention, a cooling unit rather than a heating unit being used therein.

An "empty" light 431 is embodied in my machine which is caused to be illuminated when the cups have been exhausted from the cup drop mechanism D. A switch 433 for controlling the energization of the empty light 431 is embodied in the cup drop mechanism and embodies two contacts 435 and 436, and a blade 438 which is normally held by cups in the cup drop mechanism D in engagement with the contact 435. When the cups are exhausted from the cup drop mechanism D, the blade 438 of the switch 433 is permitted thereby to move from engagement with the contact 435 into engagement with the contact 436.

It will be remembered that at the close of a beverage vending cycle of my machine 20, the anti-jackpot relay 222 and the cup drop relay 246 are both deenergized, and the blade 253 of the cup drop switch 77d is disposed in its normal engagement with the contact 251. Hence, upon the completion of a cycle of operation which exhausts the supply of cups in the cup drop mechanism D, the engagement of the blade 438 of the "empty" switch 433 with the contact 435 completes a circuit through the "empty" light 431, which causes the light to be illuminated and thereby advise prospective customers that the machine is "empty." This circuit extends from the main power line 204a, through the line 204b, a line 441, the empty light 431, a line 443, the contact 436 of the switch 433, the blade 438, a line 445, the contact 231 of the anti-jackpot relay 222, the normally closed blade 233, the line 243, the blade 245 of the cup drop relay 246, the contact 247, the line 249, the contact 251 of the cup drop switch 77d, the blade 253, the line 250, and the line 205d back to the other main power line 205a.

A blocking magnet 451, Fig. 19, is included in the coin receiving mechanism 39 as is customary in such mechanism. The blocking magnet may have prongs thereon, not shown, or other suitable mechanism associated therewith, which when the magnet is not energized are disposed in the coin passageway or passageways to thereby block the path of the coins through the coin chute of the coin receiving mechanism 39 and cause the coins to be deflected into the coin "reject" or "return" slot.

Deenergization of the blocking magnet 451 is effected by any one of several conditions in my novel machine. One of such conditions is when the blade 438 of the empty switch 433 on the cup drop mechanism D is moved into engagement with the contact 436 by absence of cups. Another such condition is when the anti-jackpot relay is energized. Another condition effective to deenergize the blocking magnet is when the cup drop relay is energized.

Thus, it will be seen that when the cup dispenser D is emptied of cups, the blocking magnet 451 is deenergized to thereby block the coin chute and cause any coins dropped into the coin slot 39a by customers to be returned. Also, when either the anti-jackpot relay 222 or the cup drop relay 246 is energized, the blocking magnet is deenergized. It will be remembered that when the anti-jackpot relay 222 is deenergized toward the close of a cycle of operation of my machine 20, the cup drop relay 246 is energized and, therefore, this latter control of the blocking magnet is effective to cause the "return" of all coins dropped into the coin slot 39a during the dispensing operation of the machine.

The control circuit for the blocking magnet, extending through the empty switch 433, extends from the main power line 204a, through the line 204b, a line 453, the blocking magnet 451, a line 455, the contact 435 of the empty switch 433, the blade 438, the line 445, the contact 231 of the anti-jackpot relay 222, the normally closed blade 233, the line 243, the normally closed blade 245 of the cup drop relay 246, the contact 247, the line 249, the contact 251 of the cup drop switch 77d, the blade 253, the line 250, and the line 205d back to the other main power line 205a. Hence, it will be seen that when the blade 438 is moved out of engagement with the contact 435 of the "empty" switch 433 with which it is normally engaged, or the blade 233 of the anti-jackpot relay 222, is disengaged from the contact 231 by energization of the anti-jackpot relay 222, or the blade 245 of the cup drop relay 246 is disengaged from the contact 247 of the cup drop relay 246 by the energization of the latter, or the blade 253 of the cup drop switch 77d is disengaged from the contact 251, the circuit to the blocking magnet 251 is broken to thereby effect return of all coins inserted into the coin slot 39a under those conditions.

The anti-jackpot relay 222 in my novel machine 20 serves several purposes. One of these purposes is that energization thereof deenergizes the blocking magnet 451 as previously described, and thereby causes the return of any additional coins dropped into the coin slot 39a during an operating cycle of the machine when the anti-jackpot relay is energized. Another purpose is that it prevents a cycle of the machine from occurring in the event that a coin should be jammed in the vending switch 220 to thereby wedge the blade 226 in engagement with the contact 225, or if the switch 220 should fail so that the blade 226 remains electrically connected to the contact 225. This occurs because, although the anti-jackpot relay 222 would be energized under such conditions, the master relay 210 cannot be energized until the blade 226 of the vending switch 220 again returns to normal position wherein it is engaged with the contact 224 and, therefore, a vending cycle of my machine 20 would not occur under those conditions.

From the foregoing it will be seen that I have afforded a novel beverage vending machine which is relatively simple in construction, is reliable and efficient in operation, and may be easily operated by customers.

Also, it will be seen that I have afforded a novel machine which may be quickly and easily serviced.

In addition, it will be seen that I have afforded a novel beverage vending machine wherein the parts thereof are constituted and arranged in a novel and expeditious manner.

Thus, while I have illustrated and described the preferred embodiment of my invention, it is to be understood that this is capable of variation and modification.

I claim:

1. A beverage vending machine comprising a plurality of powdered ingredient holding means disposed at a plurality of stations, liquid dispensing means disposed at another station, means for intermittently moving a cup to each of said stations during a cycle of operation of the machine, and means connected to said last mentioned means and controlled thereby for selectively feeding powdered ingredients and liquid from said holding means into said cup when said cup is disposed at respective ones of said stations, and means for keeping said ingredients separated until they are deposited in said cup.

2. A beverage vending machine comprising means for feeding a cup to successive stations in the machine during a beverage vending cycle of operation, means connected to said first mentioned means for stopping the said cup at each of said stations, means holding a plurality of powdered beverage ingredients at certain of said stations, means controlled by said first named means for selectively feeding said ingredients into such a cup when the latter is stopped at respective ones of said stations, said feeding means maintaining all of said ingredients separated until they are deposited in said cup, and means controlled by said first named means for feeding liquid into said cup after said selective operation of said ingredient feeding means.

3. A beverage vending machine comprising a turntable having four stations equally spaced therearound, means for depositing a cup on said turntable at one of said stations, means for intermittently and successively rotating said turntable through three one-quarter turns during a cycle of operation of the machine to thereby successively move said cup from said one station to each of said other stations, two electrically operated powdered ingredient dispensing means disposed at said second station and operable upon energization to dispense powdered ingredient into a cup disposed at said second station, two other electrically operable powdered ingredient dispensing means disposed at said third station and operable upon energization to dispense powdered ingredient into a cup disposed at said third station, electrically operated fluid dispensing means disposed at said fourth station and operable upon energization to dispense fluid into a cup disposed at said fourth station, switch means for selecting said ingredients to be dispensed and initiating a cycle of operation of the machine, and means connected to and controlled by said switch means and said means for rotating said turntable for selectively energizing said ingredient dispensing means and said fluid dispensing means when said cup is disposed at said respective stations.

4. A beverage vending machine comprising a housing having four stations therein, a turntable mounted in said housing for moving a cup from the first of said stations to each of the other of said stations successively upon operative rotation of said turntable, means for effecting said operative rotation of said turntable, beverage ingredient dispensing means mounted at each of the second and third of said stations, each of said last named means comprising a motor, electro-magnetic switching means for controlling said motor, and means driven by said motor for de-energizing said last named means, switch means, means connected to, and controlled by, said switch means and said means for effecting operative rotation of said turntable for selectively energizing said electro-magnetic switching means and thereby selectively energizing said motors, and means connected to, and controlled by, said switch means and said means for effecting operative rotation of said turntable for feeding fluid into said cup when the latter is disposed at said fourth station.

5. A beverage vending machine comprising a housing having four stations therein, a turntable, means for depositing a cup on said turntable at the first of said stations, a motor connected to said turntable and operable upon energization to rotate said turntable through a path of travel effective to move said cup from said first station successively to the other three of said stations, means at the second and third of said stations for dispensing beverage ingredients into said cup, each of said last named means comprising a dispenser, a motor connected to said dispenser and operable during one cycle of operation thereof to actuate said dispenser to discharge one charge of beverage ingredient, an electro-magnetic switch operable upon energization to initiate operation of said last mentioned motor, and a switch connected to said electro-magnetic switch and operable by said last mentioned motor at the close of a cycle of operation of the latter to de-energize said electro-magnetic switch, selector switching means connected to said electro-magnetic switches for selecting the latter to be energized, means operable by said first mentioned motor for energizing said electro-magnetic switches selected by said selector switching means, means operable by said first mentioned motor during the latter part of a cycle of operation of the machine for effecting operation of said first mentioned means to thereby deposit a cup at said first station on said turntable for advancing by the latter during the next cycle of operation of the machine, means controlled by said first mentioned means for feeding fluid into said cup when the latter is disposed at said fourth station, means for energizing said first mentioned motor at the start of a cycle of operation of the machine, and means operable by said first mentioned means at the close of a cycle of operation of said machine to deenergize said first mentioned motor.

6. A beverage vending machine having a preliminary station and a discharge station and comprising means for feeding a cup from said preliminary station to said discharge station during a cycle of operation of the machine, means for dispensing said cup to said preliminary station during the preceding cycle of the machine, means for selectively feeding beverage ingredients into said cup during said movement of the latter from said preliminary station to said discharge station, means for feeding fluid into said cup after the feeding of the ingredients thereinto, means actuatable by said first mentioned means for effecting operation of said means for feeding cups, said means for feeding fluid, and the selected means for feeding ingredients, manually operable means for initiating operation of said first mentioned means, and means operable by said cup dispensing means for stopping operation of said first mentioned means and said cup feeding means.

7. A beverage vending machine having a preliminary station and a discharge station and comprising a motor, means driven by said motor during operation of the latter for feeding a cup from said preliminary station to said discharge station during a cycle of operation of the machine, means for dispensing said cup to said preliminary station during the preceding cycle of the machine, means for selectively feeding beverage ingredients into said cup during said movement of the latter from said preliminary station to said discharge station, means for feeding fluid into said cup after the feeding of the ingredients thereinto, means actuatable by said first mentioned means for effecting operation of said means for feeding cups, said means for feeding fluid, and the selected means for feeding ingredients, coin controlled means for initiating operation of said motor, and means operable by said cup dispensing means for stopping operation of said motor and said cup dispensing means.

8. A beverage vending machine having a plurality of stations therein, means for feeding cups disposed at the first of said stations, means for feeding beverage ingredients into said cups disposed at the next of said stations, means for feeding fluid into said cups disposed at the next of said stations, a motor, means driven by said motor for moving said cups from said first station successively to the other of said stations, means connected to said ingredient feeding means for selecting the ingredients to be dispensed, means connected to said selecting means and operable by said motor for effecting ingredient feeding operation of the ingredient feeding means selected on said selector means, means connected to said cup feeding means and operable by said motor for initiating operation of said cup feeding means, means connected to said fluid feeding means and operable by said cup feeding means for initiating and stopping operation of said fluid feeding means, means including a coin-controlled switch for initiating operation of said motor, and means operable by said cup feeding means for stopping operation of said motor and said cup feeding means.

9. A machine for selectively vending a plurality of beverages and having a cup dispensing station, ingredient dispensing stations, and a fluid dispensing station, said machine comprising means for moving a cup from said cup dispensing station successively to each of the other of said stations, a motor connected to said first mentioned means and operable to drive the latter during a beverage vending cycle of operation of the machine, control means connected to, and driven by, said motor during operation of the latter, cup dispensing means for dispensing a cup at said cup dispensing station, means connected to said cup dispensing means and operable by said control means for initiating operation of said cup dispensing means to thereby dispense a cup to said cup dispensing station during a cycle of operation of the machine for movement by said first mentioned means during the next cycle of operation of the machine, a plurality of ingredient dispensing means for dispensing ingredients into said cups moved by said first mentioned means at said ingredient dispensing station, each of said ingredient dispensing means comprising a dispenser holding a supply of an ingredient to be dispensed, a motor connected to said dispenser and operable during operation to actuate said dispenser to dispense a charge of said ingredient into the station at which said last mentioned dispensing mean is disposed, an electro-magnetic switch connected to said last mentioned motor and effective, when energized, to energize the latter and, when de-energized, to maintain the latter de-energized, a second switch connected to said electro-magnetic switch and operable by said control means to energize said electro-magnetic switch, and a third switch connected to said electro-magnetic switch and operable by said last mentioned motor to de-energize said electro-magnetic switch and thereby stop said last mentioned motor, manually operable means connected between said second switch and said electro-magnetic switch of each of said ingredient dispensing means for manually selecting the ingredient dispensing means to be actuated during a beverage vending cycle of operation of the machine, fluid dispensing means for dispensing fluid into said cups moved by said first mentioned means into said fluid dispensing station, means connected to said fluid dispensing means and controlled by said cup dispensing means for actuating said fluid dispensing means, means including a coin-controlled switch for initiating operation of said first mentioned motor, and means operable by said cup dispensing means for stopping operation of said first mentioned motor and said cup dispensing means.

10. A machine for selectively vending a plurality of beverages and comprising electric power means, electro-magnetic switching means, means, including a coin-operated switch, connected to said power means and said switching means for controlling the energization of the latter, a plurality of electrically-operable beverage ingredient dispensing means, a manually operable selector switch connected to said dispensing means and said switching means for manually selecting the dispensing means to be connected to said switching means, fluid feeding means, means operable through a predetermined cycle of operation to move a cup through a predetermined path of travel into position to receive a beverage ingredient from each of said ingredient dispensing means selected on said selector switch and to receive fluid from said fluid dispensing means, a motor connected to said cup moving means for driving the latter, said electro-magnetic switching means being connected to said motor and being operable, upon energization, to connect said motor to said power means and thereby initiate operation of said motor, control means driven by said motor during operation of the latter, means, including said control means, for connecting said selected ingredient dispensing means and said fluid dispensing means to said switching means and thereby to said power means during operation of said motor, means connected to said cup feeding means and operable by said control means for initiating operation of said cup feeding means, means operable by said cup-feeding means to disconnect said switching means from said power means to thereby de-energize said switching means and said motor, and means operable by said cup-feeding means to stop the latter.

11. A machine for selectively dispensing a plurality of beverages and having a cup receiving station, beverage ingredient receiving stations, and a cup discharge station, said machine comprising a turntable, cup dispensing means mounted in position to deposit a cup in upright position on top of said turntable at said cup receiving station, said turntable being rotatable through a predetermined movement to advance such a cup in said upright position from said cup receiving station to each of the other of said stations successively, a plurality of beverage ingredient dispensing means disposed in position at each of said ingredient receiving stations to dispense a charge of powdered beverage ingredient by gravity into said cup when the latter is disposed at the respective one of said last mentioned stations, said ingredient dispensing means including conduit means disposed above said turntable for keeping said ingredients separated until deposited in said cup, selector means connected to said ingredient dispenser means for selecting the ingredient to be dispensed, fluid dispensing means disposed in position at said discharge station to dispense fluid into said cup when the latter is disposed at said last mentioned station, a motor, means, including a coin-controlled switch, for initiating operation of said motor, drive means connected to said motor and said turntable and operable during operation of said motor to move said turntable through said predetermined movement, and means for controlling operation of said motor, said cup dispensing means, selected ingredient dispensing means, and said fluid dispensing means, said means for controlling operation including said drive means.

12. In a beverage vending machine, a turntable, means for depositing a cup on said turntable, electrically operable drive means connected to said turntable for rotating the latter through a predetermined movement and thereby move said cup along a predetermined path of travel, means for feeding a powdered ingredient into said cup during movement thereof along said path of travel, said last named means comprising a dispenser operable upon actuation to discharge a measure of said ingredient, a motor drivingly connected to said dispenser, an electro-magnetic switch connected to said motor and operable upon energization to initiate operation of said motor to thereby actuate said dispenser, and a switch operable by said motor after said actuation of said dispenser to de-energize said electro-magnetic switch and thereby stop said motor, means for dispensing fluid into said cup at the end of said movement of said turntable, coin-controlled means for initiating the operation of said drive means, means actuated by said drive means for energizing said electro-magnetic switch, and means for stopping operation of said drive means.

13. In a beverage vending machine, a turntable, a plurality of powdered ingredient dispensers mounted above said turntable in substantially annularly spaced relation to each other for feeding powdered ingredients, means for feeding a cup onto said turntable, means for feeding liquid into such a cup, rotatably mounted means operatively connected to said turntable for rotating the latter through a path of travel effective to move such a cup from said feeding means, successively past said dispensers, to said liquid feeding means, and means for controlling operation of said dispensers, said cup feeding means, said liquid feeding means, and said rotatably mounted means, said controlling means comprising a plurality of switches connected to said dispensers and said cup feeding means and operable by said rotatably mounted means.

14. In a beverage vending machine, means for dispensing a cup, means disposed in spaced relation to said first mentioned means for feeding liquid into such a cup after the latter has been dispensed by said first mentioned means, a turntable operable upon rotation through a predetermined path of travel to move said cup from said first mentioned to said second mentioned means, a plurality of dispensers disposed above said turnable in position to feed beverage ingredients into said cup during said movement of the latter by said turntable between said two means, a plurality of motors, each of said motors being connected to a respective one of said dispensers for actuating the latter, a plurality of relay switches, each of said relay switches being so connected to a respective one of said motors as to initiate operation of said motor upon energization of said relay switch, means operable by each of said motors for de-energizing said respective relay switch and thereby stop said motor, and means for controlling the operation of said first two means, said turntable, and said relay switches, said control means comprising rotatable means connected to said turntable for rotating the latter through said path of travel, switch means connected to said relay switches and engaged by, and controlled by, said rotatable means during rotation of the latter, means for initiating rotation of said rotatable means, and means, including said cup dispensing means, for stopping rotation of said rotatable means.

15. A beverage vending machine comprising a plurality of beverage-ingredient dispensers disposed at a plurality of stations, means for moving a cup to each of said stations during a cycle of operation of the machine, means for selectively feeding said ingredients from said dispensing means into said cup when said cup is disposed at respective ones of said stations, an electro-magnetic switch connected to said moving means and said feeding means for controlling the operation thereof, means for energizing said electro-magnetic switch, said last named means including a switch actuatable by movement of a coin along a predetermined path relative thereto, and another electro-magnetic switch connected to said second mentioned switch and said first mentioned electro-magnetic switch, means, including said other electro-magnetic switch, for de-energizing said first mentioned electro-magnetic switch, means including said other electro-magnetic switch, affording a holding circuit for said first mentioned electro-magnetic switch, said other electro-magnetic switch being so connected to said first mentioned electro-magnetic switch and said second mentioned switch as to prevent the retention of said first mentioned electro-magnetic switch in energized condition by the stopping of a coin in said path of travel.

References Cited in the file of this patent

UNITED STATES PATENTS

| | | |
|---|---|---|
| 2,055,214 | Christianson | Sept. 22, 1936 |
| 2,552,856 | Knapp | May 15, 1951 |
| 2,614,738 | Mills | Oct. 21, 1952 |
| 2,685,393 | Thompson | Aug. 3, 1954 |